(12) United States Patent
Lee et al.

(10) Patent No.: US 10,032,295 B2
(45) Date of Patent: Jul. 24, 2018

(54) TOMOGRAPHY APPARATUS AND METHOD OF PROCESSING TOMOGRAPHY IMAGE

(71) Applicant: SAMSUNG ELECTRONICS CO., LTD., Suwon-si (KR)

(72) Inventors: Duhgoon Lee, Yongin-si (KR); Kyoung-yong Lee, Hwaseong-si (KR); Doil Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 15/018,415

(22) Filed: Feb. 8, 2016

(65) Prior Publication Data
US 2016/0292849 A1    Oct. 6, 2016

(30) Foreign Application Priority Data
Apr. 6, 2015  (KR) .................. 10-2015-0048329

(51) Int. Cl.
| | |
|---|---|
| *G06T 11/00* | (2006.01) |
| *G06T 7/246* | (2017.01) |
| *G06T 5/00* | (2006.01) |

(52) U.S. Cl.
CPC .......... *G06T 11/008* (2013.01); *G06T 5/001* (2013.01); *G06T 7/246* (2017.01); *G06T 2207/10081* (2013.01)

(58) Field of Classification Search
CPC ....... G06T 11/008; G06T 5/001; G06T 7/246; G06T 2207/10081
USPC ....................................... 382/131
See application file for complete search history.

(56) References Cited

U.S. PATENT DOCUMENTS

| | | | |
|---|---|---|---|
| 6,888,915 B2 | 5/2005 | Koenig et al. | |
| 7,672,490 B2 | 3/2010 | Kohler et al. | |
| 8,055,050 B2 | 11/2011 | Roessl et al. | |
| 8,938,112 B2 | 1/2015 | Park et al. | |
| 2007/0092055 A1 | 4/2007 | Vives et al. | |
| 2010/0054570 A1* | 3/2010 | Lamerichs | G01R 33/56509 382/131 |

(Continued)

FOREIGN PATENT DOCUMENTS

| | | |
|---|---|---|
| KR | 10-2013-0083205 A | 7/2013 |
| KR | 10-2014-0062374 A | 5/2014 |

OTHER PUBLICATIONS

Communication dated Jun. 1, 2017 issued by the Korean Intellectual Property Office in counterpart Korean Patent Application No. 10-2015-0048329.

*Primary Examiner* — Amandeep Saini
(74) *Attorney, Agent, or Firm* — Sughrue Mion, PLLC

(57) ABSTRACT

A tomography apparatus and a method of processing a tomography image are provided. The tomography apparatus includes a data acquirer configured to acquire a first image corresponding to a first time point and a second image corresponding to a second time point, based on data that is obtained from performing tomography on a moving object, acquire first information indicating a movement of the object between the first time point and the second time point, and determine a motion reliability indicating a degree to which the movement of the object corresponds to a physical movement, based on the first information. The tomography apparatus further includes an image reconstructor configured to reconstruct a target image indicating the object at a target time point, based on the motion reliability.

20 Claims, 24 Drawing Sheets

(56) References Cited

U.S. PATENT DOCUMENTS

2014/0133707 A1  5/2014  Park et al.

* cited by examiner

TOMOGRAPHY APPARATUS AND METHOD OF PROCESSING TOMOGRAPHY IMAGE

CROSS-REFERENCE TO RELATED APPLICATION

This application claims priority from Korean Patent Application No. 10-2015-0048329, filed on Apr. 6, 2015, in the Korean Intellectual Property Office, the disclosure of which is incorporated herein in its entirety by reference.

BACKGROUND

1. Field

Apparatuses and methods consistent with exemplary embodiments relate to a tomography apparatus and a method of processing a tomography image, and more particularly, to a computed tomography (CT) image processing apparatus configured to compensate for a motion of a moving object more precisely when obtaining a cross-sectional image, and a method of processing the CT image.

2. Description of the Related Art

Apparatuses for capturing a medical image obtain an image of an internal structure of an object. The apparatuses for capturing the medical image are non-invasive and enable users to view an image of an object after capturing and processing an image of structural details of a body, internal organs, and flow of body fluids. Users, including doctors, may diagnose medical conditions and diseases of a patient by using a medical image generated by apparatuses for capturing a medical image. Apparatuses for capturing and processing a medical image may include a magnetic resonance imaging (MRI) apparatus, a computed tomography (CT) imaging apparatus, an X-ray apparatus and an ultrasound imaging apparatus, and may generate the medical image by processing data of the captured image.

Compared with other apparatuses for capturing medical images, a tomography apparatus may provide a cross-sectional image of an object and display an image in such a manner that the images of an internal structure of an object (e.g., organs including a kidney and a lung) do not overlap, unlike regular X-ray apparatuses. When a target object of a tomography operation is in motion, artifacts may occur that degrade image quality of the cross-sectional image of the object. Therefore, the number of artifacts caused by motion of the moving object may be reduced, to obtain an accurate cross-sectional image when performing tomography on the moving object.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments include a tomography apparatus that may compensate for a motion of a moving object more precisely by improving the accuracy of measuring the motion of the moving object, when obtaining a cross-sectional image by performing tomography on the moving object.

According to an aspect of an exemplary embodiment, a tomography apparatus includes a data acquirer configured to acquire a first image corresponding to a first time point and a second image corresponding to a second time point, based on data that is obtained from performing tomography on a moving object, acquire first information indicating a movement of the object between the first time point and the second time point, and determine a motion reliability indicating a degree to which the movement of the object corresponds to a physical movement, based on the first information. The tomography apparatus further includes an image reconstructor configured to reconstruct a target image indicating the object at a target time point, based on the motion reliability.

The image reconstructor may be further configured to determine whether to reconstruct the target image by performing motion compensation on the target image, based on the motion reliability, and generate the target image based on the determining.

The first information may include right directional vectors indicating the movement of the object from the first time point to the second time point, and reverse directional vectors indicating the movement of the object from the second time point to the first time point.

The data acquirer may be further configured to determine the motion reliability based on a motion error of a right directional vector, among the right directional vectors, and a reverse directional vector corresponding to the right directional vector, among the reverse directional vectors.

The motion reliability may be proportional to a reciprocal of the motion error.

The image reconstructor may be further configured to reconstruct the target image by performing motion compensation on the target image in response to the motion reliability being greater than or equal to a value.

The image reconstructor may be further configured to divide the target image into partial sections, and for each of the partial sections, in response to the motion reliability within a partial section being greater than or equal to a value, perform motion compensation on the partial section.

The image reconstructor may be further configured to reconstruct the target image by performing motion compensation on the target image with a weighted value corresponding to the motion reliability.

The image reconstructor may be further configured to determine the motion reliability based on the first information for each of voxels in the target image.

The apparatus may further include a display configured to display a color-coded image marking, on each of the voxels, a color corresponding to the motion reliability.

The apparatus may further include a display configured to display a user interface for determining whether to perform motion compensation on the target image, the user interface being configured to receive a user input.

The apparatus may further include a display configured to display a screen indicating whether motion compensation is performed for each of partial sections of the target image.

The apparatus may further include a display configured to display at least one among the motion reliability, the target time point, and the target image.

The data acquirer may be further configured to acquire reconstructed images that are motion compensated at time points between the first time point and the second time point, based on the first information, determine an error by comparing estimated projection data that is acquired by a forward projection of the reconstructed images and measured projection data that is acquired by computed tomography imaging at the time points, and determine the motion reliability based on the error.

According to an aspect of another exemplary embodiment, there is provided a method of processing a tomography image, the method including acquiring a first image corresponding to a first time point and a second image corresponding to a second time point, based on data that is obtained from performing tomography on a moving object, acquiring first information indicating a movement of the object between the first time point and the second time point, determining a motion reliability indicating a degree to which the movement of the object corresponds to a physical movement, based on the first information, and reconstructing a target image indicating the object at a target time point, based on the motion reliability.

The reconstructing may include determining whether to reconstruct the target image by performing motion compensation on the target image, based on the motion reliability, and generating the target image based on the determining.

The reconstructing may include reconstructing the target image by performing motion compensation on the target image in response to the motion reliability being greater than or equal to a value.

The reconstructing may include dividing the target image into partial sections, and for each of the partial sections, in response to the motion reliability within a partial section being greater than or equal to a value, performing motion compensation on the partial section.

The reconstructing may include reconstructing the target image by performing motion compensation on the target image with a weighted value corresponding to a motion reliability.

A non-transitory computer-readable recording medium may store a program including instructions to cause a computer to perform the method.

BRIEF DESCRIPTION OF THE DRAWINGS

The above and/or other aspects will become more apparent by describing exemplary embodiments with reference to the accompanying drawings, in which.

DETAILED DESCRIPTION

Figure 1:
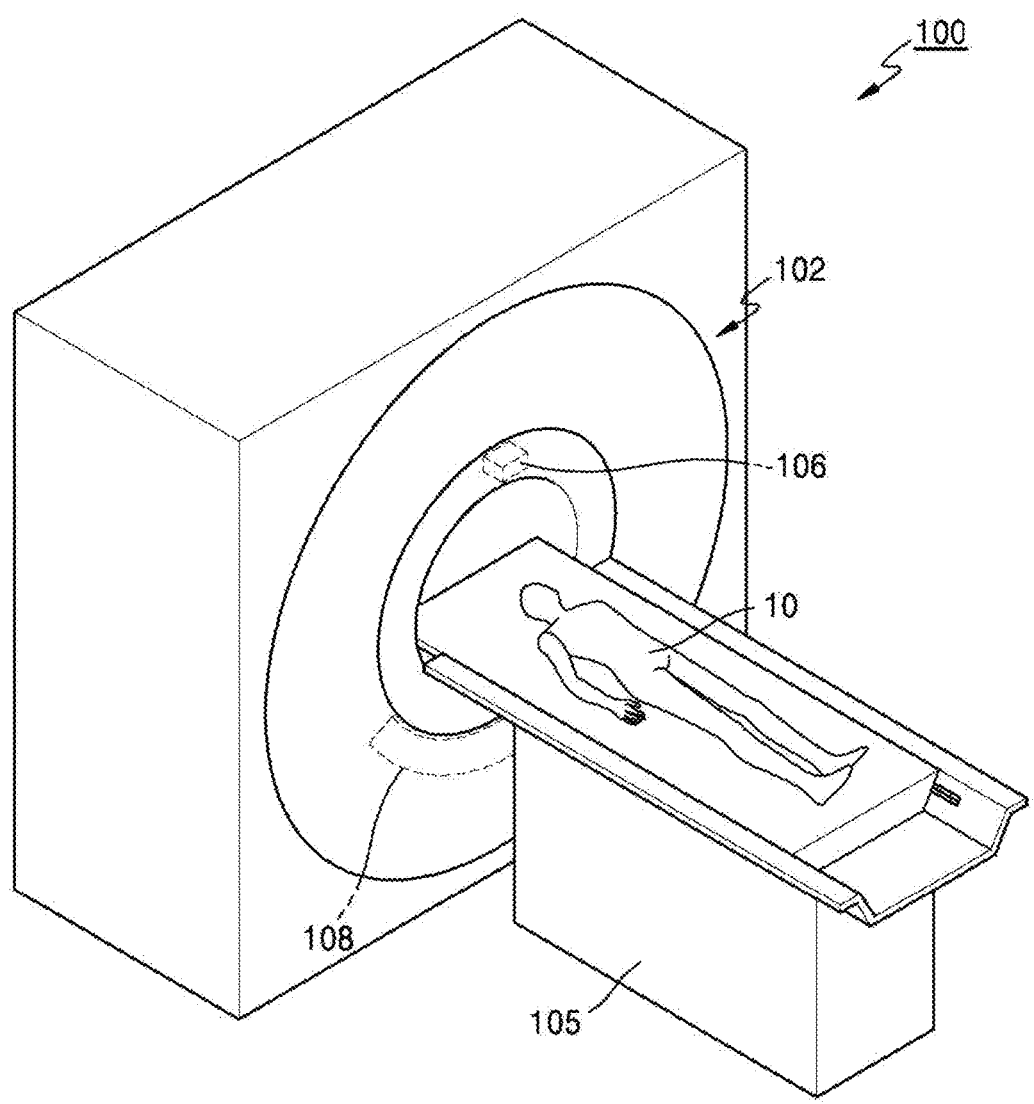
FIG. 1 is a view illustrating a computed tomography (CT) system, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail because they would obscure the description with unnecessary detail.

When a part "includes" or "comprises" an element, unless there is a description contrary thereto, the part can further include other elements, not excluding the other elements. Also, the term "unit" in the exemplary embodiments refers to a software component or hardware component such as a field-programmable gate array (FPGA) or an application-specific integrated circuit (ASIC), and performs a specific function. However, the term "unit" is not limited to software or hardware, and may refer to a combination thereof. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units."

Throughout the specification, an "image" may mean multi-dimensional data formed of discrete image elements, e.g., pixels in a two-dimensional (2D) image and voxels in a three-dimensional (3D) image. For example, the image may include a medical image of an object that is captured by a computed tomography (CT) imaging apparatus.

Throughout the specification, a "CT image" may mean an image generated by synthesizing a plurality of X-ray images that are obtained by photographing an object while a CT imaging apparatus rotates around at least one axis with respect to the object.

Furthermore, in the present specification, an "object" may be a human, an animal, or a part of a human or animal. For example, the object may be an organ (e.g., the liver, heart, womb, brain, breast, or abdomen), a blood vessel, or a combination thereof. The object may be a phantom. The phantom is a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Because a CT system is capable of providing a cross-sectional image of an object, the CT system may distinctively express an inner structure, e.g., an organ such as a kidney or a lung, of the object, compared to an X-ray imaging apparatus.

The CT system may obtain a plurality of pieces of image data with a thickness not more than 2 mm several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below:

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any direction.

Editing—a method of editing adjacent voxels to allow a user to easily observe an area of interest in volume rendering.

Voxel of interest (VOI)—a method of displaying only a selected area in volume rendering.

A CT system 100 according to an exemplary embodiment will now be described with reference to FIG. 1. The CT system 100 may include various types of devices.

FIG. 1 is a view illustrating the CT system 100, according to an exemplary embodiment. Referring to FIG. 1, the CT system 100 includes a gantry 102, a table 105, an X-ray generator 106, and an X-ray detector 108.

The gantry 102 includes the X-ray generator 106 and the X-ray detector 108.

An object 10 is positioned on the table 105. The table 105 may move in a predetermined direction (e.g., at least one of up, down, right, and left directions) during a CT imaging procedure. Also, the table 105 may tilt or rotate by a predetermined angle in a predetermined direction.

The gantry 102 may also tilt by a predetermined angle in a predetermined direction.

Figure 2:
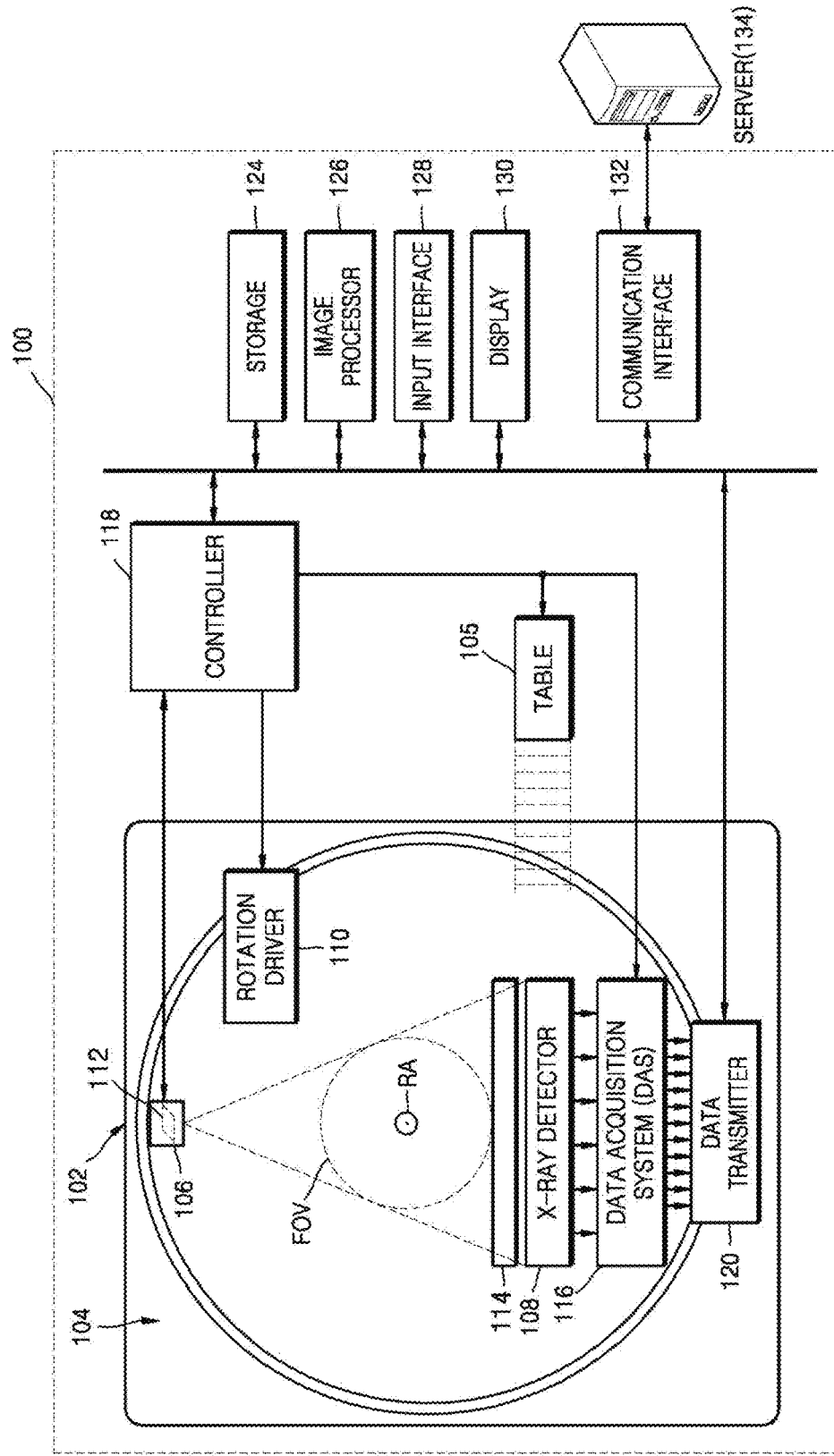
FIG. 2 is a diagram illustrating a structure of the CT system, according to an exemplary embodiment.

FIG. 2 is a diagram illustrating a structure of the CT system 100, according to an exemplary embodiment. Referring to FIG. 2, the CT system 100 includes the gantry 102, the table 105, a controller 118, a storage 124, an image processor 126, an input interface 128, a display 130, and a communication interface 132.

As described above, the object 10 may be positioned on the table 105. In an exemplary embodiment, the table 105 may move in a predetermined direction (e.g., at least one of up, down, right, and left directions), and movement of the table 105 may be controlled by the controller 118.

The gantry 102 includes a rotating frame 104, the X-ray generator 106, the X-ray detector 108, a rotation driver 110, a data acquisition system (DAS) 116, and a data transmitter 120.

The gantry 102 may include the rotating frame 104 having a loop shape capable of rotating with respect to a predetermined rotation axis RA. Also, the rotating frame 104 may have a disc shape.

The rotating frame 104 may include the X-ray generator 106 and the X-ray detector 108 that are arranged to face each other to have predetermined fields of view FOV. The rotating frame 104 also includes an anti-scatter grid 114. The anti-scatter grid 114 may be positioned between the X-ray generator 106 and the X-ray detector 108.

In a medical imaging system, X-ray radiation that reaches a detector (or a photosensitive film) includes not only attenuated primary radiation that forms a valuable image but also scattered radiation that deteriorates the quality of an image. To transmit most of the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driver 110 and may rotate the X-ray generator 106 and the X-ray detector 108 at a predetermined rotation speed. The rotating frame 104 may receive the driving signal and power from the rotation driver 110 while the rotating frame 104 contacts the rotation driver 110 via a slip ring. Also, the rotating frame 104 may receive the driving signal and power from the rotation driver 110 via wireless communication.

The X-ray generator 106 may receive a voltage and current from a power distribution unit (PDU) via a slip ring and then a high voltage generator, and may generate and emit an X-ray. When the high voltage generator applies predetermined voltage (hereinafter, referred to as a tube voltage) to the X-ray generator 106, the X-ray generator 106 may generate X-rays having a plurality of energy spectra that correspond to the tube voltage.

The rotating frame 104 also includes a collimator 112. The X-ray generated by the X-ray generator 106 may be emitted in a predetermined form due to the collimator 112.

The X-ray detector 108 may be positioned to face the X-ray generator 106. The X-ray detector 108 may be positioned to face the X-ray generator 106. Each of the plurality of X-ray detecting devices may establish one channel but one or more embodiments of the present invention are not limited thereto.

The X-ray detector 108 may detect the X-ray that is generated by the X-ray generator 106 and that is transmitted through the object 10, and may generate an electrical signal corresponding to intensity of the detected X-ray.

The X-ray detector 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detector 108. Electrical signals generated by the X-ray detector 108 may be acquired by the DAS 116. Electrical signals generated by the X-ray detector 108 may be acquired by wire or wirelessly by the DAS 116. Also, the electrical signals generated by the X-ray detector 108 may be provided to an analog-to-digital converter via an amplifier.

According to a slice thickness or the number of slices, some of a plurality of pieces of data collected by the X-ray detector 108 may be provided to the image processor 126 via the data transmitter 120, or the image processor 126 may select some of the plurality of pieces of data. Such a digital signal may be provided to the image processor 126 via the data transmitter 120. The digital signal may be provided to the image processor 126 by wire or wirelessly.

The controller 118 may control an operation of each of the elements in the CT system 100. For example, the controller 118 may control operations of the table 105, the rotation driver 110, the collimator 112, the DAS 116, the storage 124, the image processor 126, the input interface 128, the display 130, the communication interface 132, or the like.

The image processor 126 may receive data acquired by the DAS 116 (e.g., pure data that is data before processing), via the data transmitter 120, and may perform pre-processing. The pre-processing may include, for example, a process of correcting a sensitivity irregularity between channels and a process of correcting signal loss due to a rapid decrease in signal strength or due to the presence of an X-ray absorbing material such as metal.

Data output from the image processor 126 may be referred to as raw data or projection data. The projection data may be stored in the storage 124 with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all channels at the same imaging angle is referred to as a projection data set.

The storage 124 may include at least one storage medium among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The image processor 126 may reconstruct a cross-sectional image of the object 10 by using the acquired projection data set. The cross-sectional image may be a 3D image. In other words, the image processor 126 may reconstruct a 3D image of the object 10 by using a cone beam reconstruction method or the like, based on the acquired projection data set.

The input interface 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of a FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input interface 128 may include a device for receiving a predetermined input from an external source. For example, the input interface 128 may include a microphone, a keyboard, a mouse, a joystick, a touch pad, a touch pen, a voice recognition device, a gesture recognition device, or the like.

The display 130 may display an X-ray image reconstructed by the image processor 126.

Exchanges of data, power, or the like between the aforementioned elements may be performed by using at least one of wired communication, wireless communication, and optical communication.

The communication interface 132 may perform communication with an external device, an external medical apparatus, etc. via a server 134 or the like. The communication will be described with reference to FIG. 16.

Figure 3A:
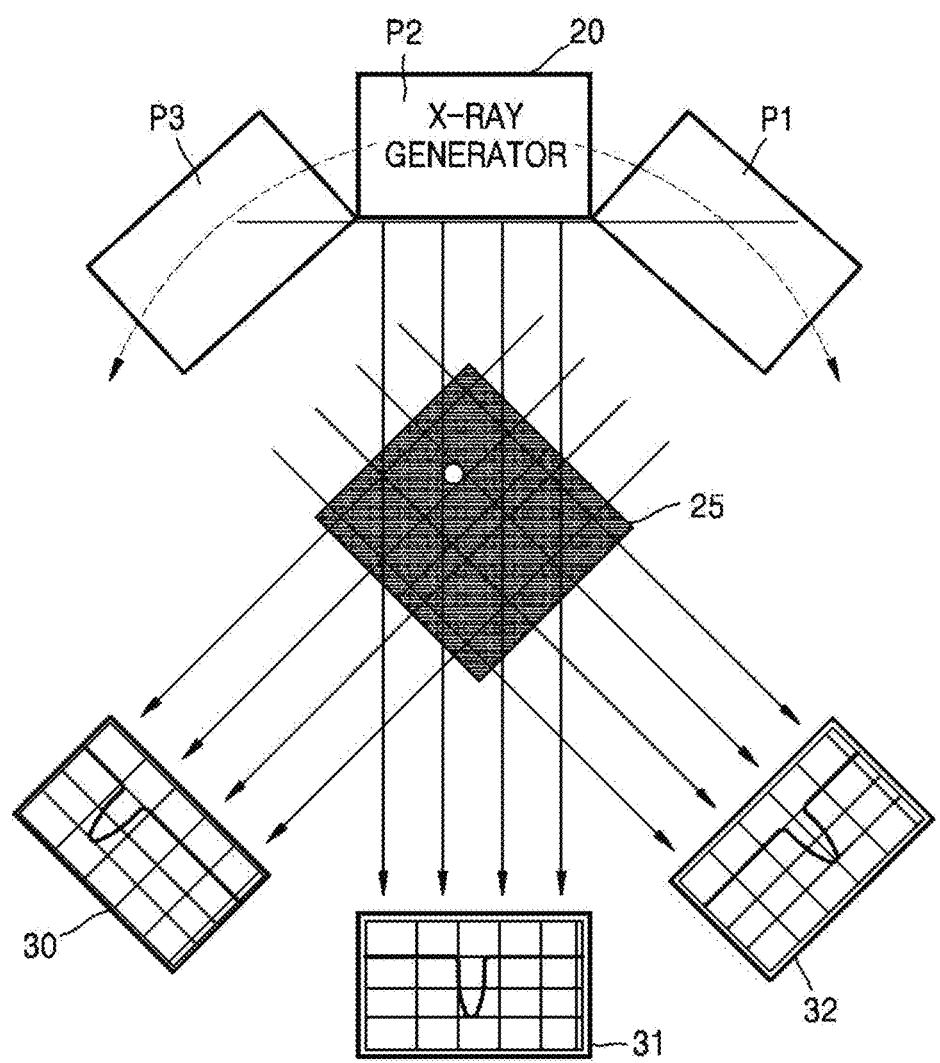
FIGS. 3A and 3B are diagrams illustrating how a tomography apparatus captures and reconstructs an image, according to an exemplary embodiment.
Figure 3B:
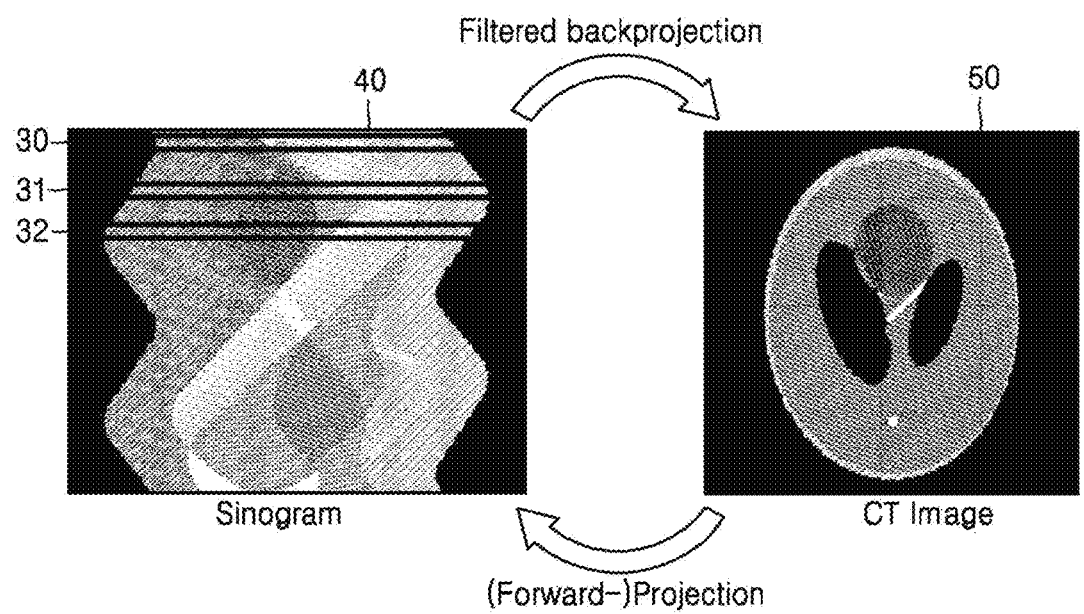

FIGS. 3A and 3B are diagrams illustrating how a tomography apparatus captures and reconstructs an image, according to an exemplary embodiment.

A tomography apparatus may be any type of medical imaging apparatus capable of reconstructing images by using projection data obtained by using radiation that penetrates the object. In detail, the tomography apparatus may be a computed tomography (CT) imaging apparatus, an optical coherence tomography (OCT) apparatus, or a positron emission tomography CT (PET-CT) apparatus. Therefore, a tomography image may be a CT image, an OCT image or a PET image.

FIGS. 3A and 3B illustrate an example in which the tomography apparatus is the CT imaging apparatus. Hereinafter, a cross-sectional image obtained by the CT imaging apparatus is referred to as a CT image.

In acquiring the CT image, the CT imaging apparatus may obtain raw data by performing the CT imaging on the object, and reconstruct the CT image by using the obtained raw data. The raw data may refer to projection data obtained by projecting an X-ray to the object, or a sinogram that is an aggregate collection of projection data. For example, the CT imaging apparatus may perform the reconstruction operation by using the sinogram that was obtained from the CT imaging, to acquire the CT image.

In detail, FIG. 3A illustrates a CT imaging process in which the CT imaging apparatus performs the CT imaging while rotating around an object 25, and acquires the raw data that corresponds to the process. The CT imaging apparatus generates and projects the X-ray to the object 25, and then detects, at an X-ray detector (refer to 108 in FIGS. 1 and 2), the X-ray that penetrates the object. The X-ray detector generates the raw data that correspond to the detected X-ray.

Referring to FIG. 3A, an X-ray generator 20, which is included in the CT imaging apparatus, projects the X-ray to the object 25. When the CT imaging apparatus captures the CT image, the X-ray generator 20 rotates around the object and acquires a plurality of raw data 30 through 32 corresponding to rotation angles. In detail, the X-ray generator 20 acquires first raw data 30 by detecting the X-ray irradiated to the object at the location of P1; acquires second raw data 31 by detecting the X-ray irradiated to the object at the location of P2; and acquires third raw data 32 by detecting the X-ray irradiated to the object at the location of P3. The raw data may refer to projection data. To generate at least one cross-sectional CT image, the X-ray generator 20 may perform the CT imaging while rotating at least 180 degrees.

FIG. 3B is a view for explaining the sinogram and reconstructed CT image that is acquired by the CT imaging. Referring to FIG. 3B, as described in relation to FIG. 3A, the CT imaging apparatus may acquire one sinogram 40 by aggregating the plurality of projection data 30 through 32 that were obtained from moving the X-ray generator 20 at predetermined angular intervals. The sinogram 40 refers to the sinogram that is acquired when the X-ray generator 20 rotates for one cycle and captures the CT image. The sinogram 40 that corresponds to the one-cycle rotation may be used in generating the CT image. The one-cycle rotation may be approximately more than a half rotation, or a full rotation, depending on the specifications of a CT system.

In addition, the CT image 50 may be reconstructed by performing filtered back-projection after filtering the sinogram 40.

It takes around 0.2 seconds to rotate the X-ray generator 20 a half rotation.

When the object, which is the target of the CT imaging, moves, even if the movement of the object occurs for one cycle, a motion artifact occurs when reconstructing the CT image due to such movement of the object. In detail, when the object moves, at least one of a shape, size and location of the object may change while the X-ray generator 20 rotates for one cycle. In other words, the projection data acquired during the one-cycle rotation may be projection data that corresponds to a different object. Accordingly, when a cross-sectional image is reconstructed by performing back projection on the acquired projection data, the motion artifact may occur.

Figure 4A:
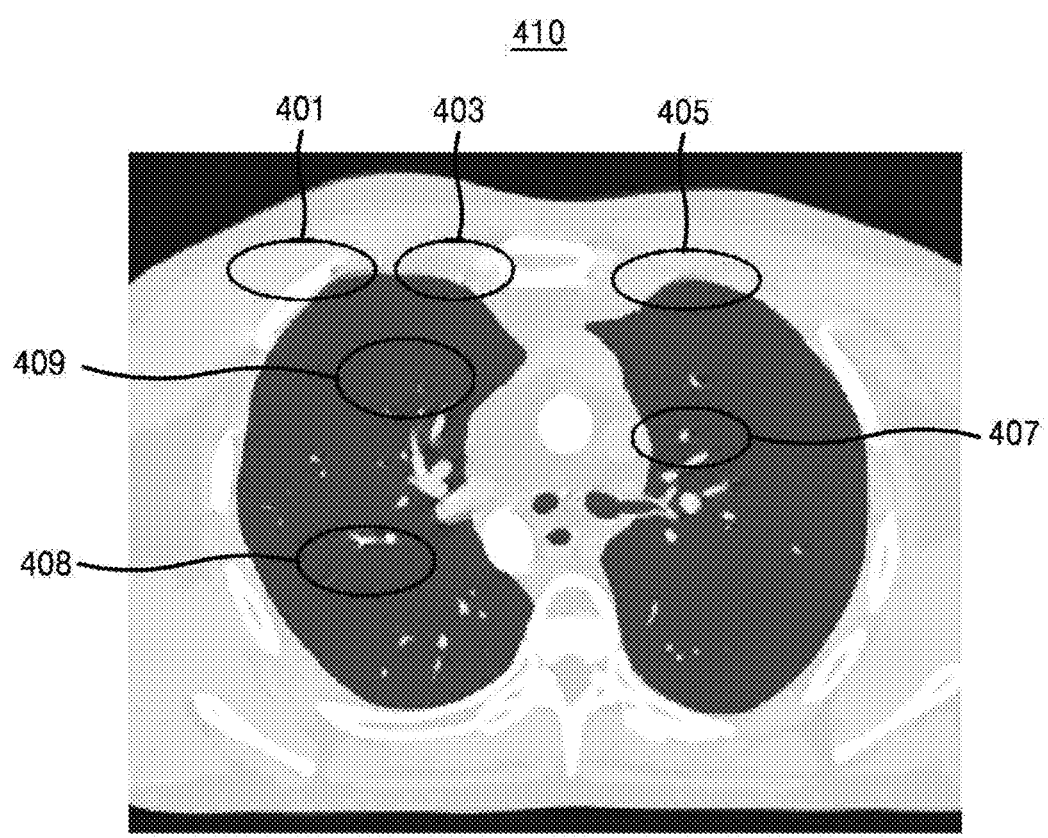
FIGS. 4A, 4B, and 4C are views illustrating CT images that have motion artifacts.
Figure 4B:
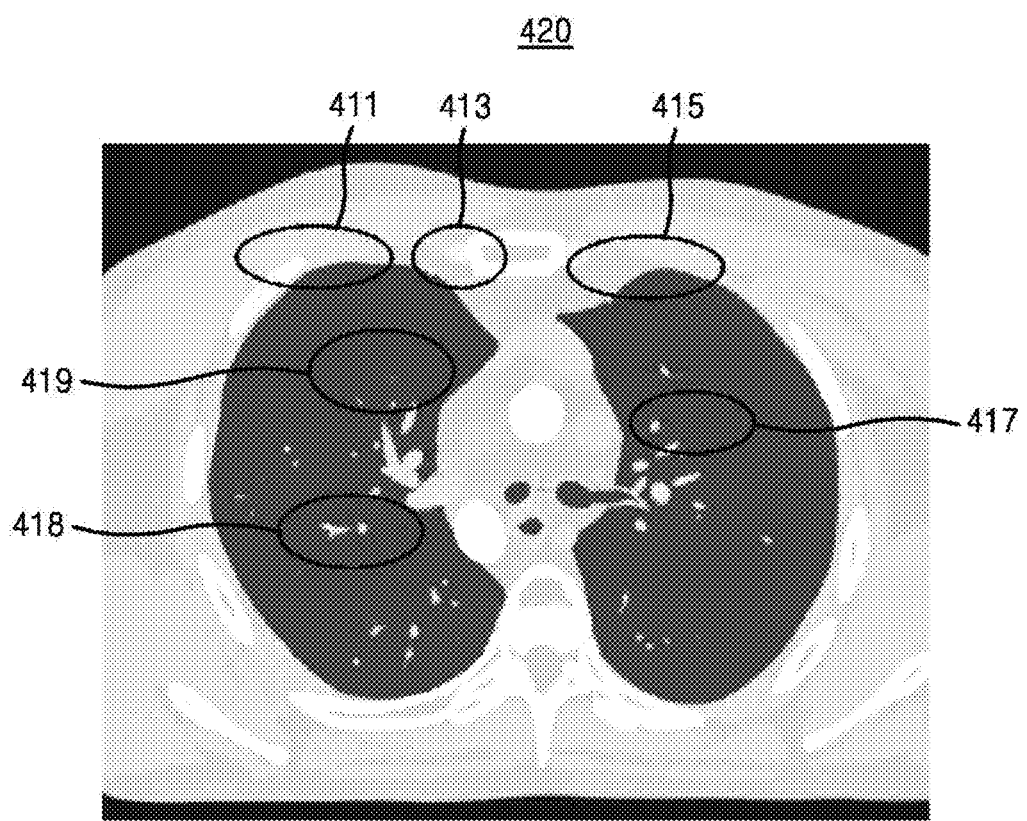
Figure 4C:
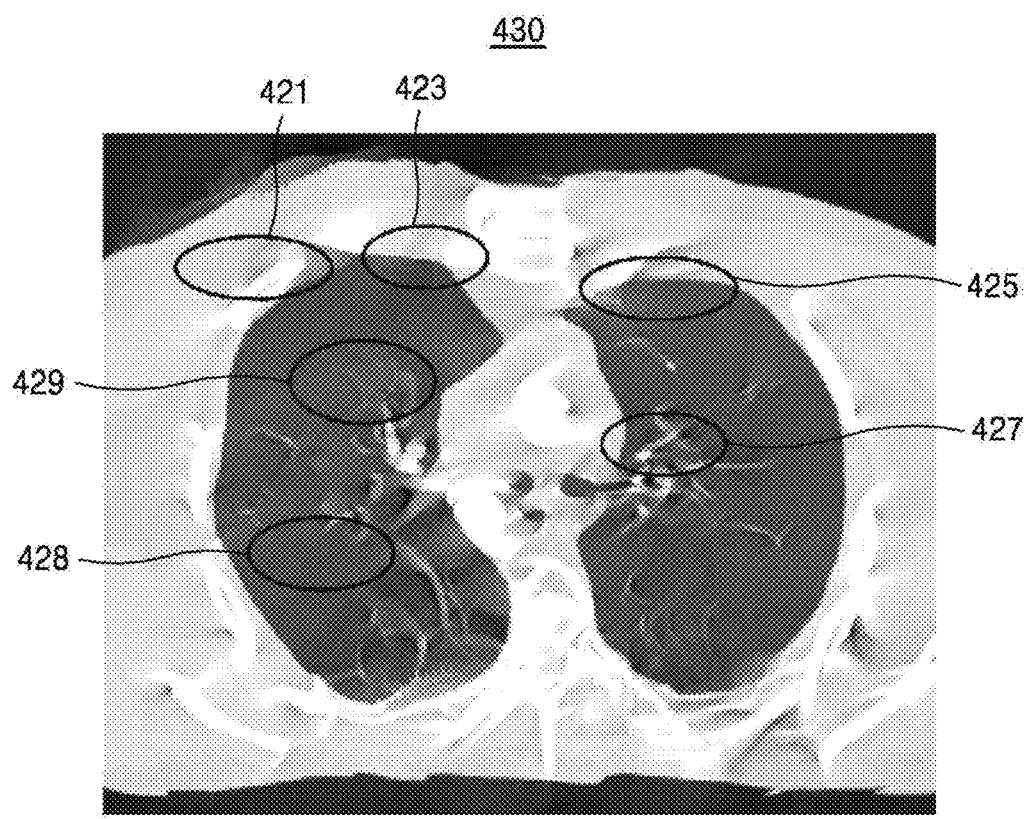

FIGS. 4A, 4B, and 4C are views illustrating CT images that have motion artifacts.

CT images 410 through 430 shown in FIGS. 4A to 4C may be cross-sectional images that were reconstructed by using data obtained from CT imaging of the chest of the object. The reconstructed cross-sectional image may be a cross-sectional image that is obtained by reconstruction by using projection data acquired while the X-ray generator (refer to 20 in FIG. 3) rotates for one cycle.

The reconstruction of the CT image may be performed in various ways. For example, when reconstructing the CT image, various methods such as a filtered back projection method and an iterative method may be used.

In a filtered back projection method, projection data, obtained from a plurality of views, are aggregated to reconstruct an image on a screen. In detail, according to the back projection, it is possible to acquire an image that closely resembles a real object based on the projection data obtained from the plurality of views. In one or more exemplary embodiments, it is also possible to additionally perform the filtering to remove artifacts that exist in the reconstructed image and improve the quality of the image.

The filtered back projection is an improved version of the back projection, to remove artifacts or blurring that may occur with the back projection. According to the filtered back projection, it is possible to reconstruct the CT image by filtering the raw data before the filtered back projection and performing the back projection of the filtered raw data.

The filtered back projection is the most widely used, easy to perform, and effective method, in terms of computational complexity among many CT image reconstruction methods. Hereinafter, the reconstruction process is described using an example in which acquired projection data is reconstructed as a cross-sectional image by back projection.

FIG. 4A illustrates the CT image 410 in which motion artifacts occurred during the process of reconstructing the CT image. Referring to FIG. 4A, the motion artifacts may occur in the CT image 410 due to the movement of the object in the CT image 410. When the motion artifacts occur, the CT image 410 may include obscure edges 401, 403 and 405 and blurred portions 407, 408 and 409. To reconstruct the CT image by compensating for the movement of the object so that it reduces or removes the motion artifacts, the movement of the object may be measured. It is possible to perform the back projection by applying the movement of the object to each of the projection data acquired during one cycle, and the cross-sectional image may be reconstructed to indicate the object at a target time point. The operation of performing back projection after compensating for the acquired projection data so that the projection data corresponds to the shape of the object at the target time point may be referred to as the 'motion compensation.' In one or more exemplary embodiments, it is possible to perform the motion compensation for the tomography image reconstructed through back projection. In detail, it is possible to predict the status of the object at the target time point of the reconstruction, depending on the movement of the object, after acquiring an initial reconstructed tomography image by back projection of the raw data. In addition, it is also possible to acquire a final tomography image with its motion compensated for by warping the initial reconstructed tomography image depending on the predicted status of the object.

As described above, as the motion compensation is performed based on the measured amount of movement, the CT imaging apparatus may measure the movement amount of the object accurately to perform precise motion compensation. In other words, when the motion compensation is performed based on the accurately measured movement data of the object, the motion artifact of the CT image 410 may be reduced or removed. When the motion compensation is performed based on inaccurately measured movement data of the object, the motion artifacts of the CT image 410 may not be reduced or removed.

FIG. 4B illustrates the CT image 420 that is reconstructed by performing the motion compensation. The CT image 420 shown in FIG. 4B corresponds to the CT image 410 shown in FIG. 4A, which is the image prior to the motion compensation. The CT image 420 shown in FIG. 4B may be the cross-sectional image that was reconstructed by performing the motion compensation, based on the accurately measured movement data of the object.

The CT image 420 shows much less motion artifacts than the CT image 410. Compared with unclear edges 401, 403 and 405 shown in the CT image 410, the CT image 420 includes clear edges 411, 413 and 415. Further, compared with the blurred portions 407, 408 and 409 shown in the CT image 410, the CT image 420 includes portions with reduced blurs 417, 418 and 419. As with the CT image 420 shown in FIG. 4B, when the motion compensation is performed based on accurately measured movement data of the object, there will be less motion artifacts for the CT image 420 than the CT image 410, which is the image prior to the motion compensation.

FIG. 4C illustrates the CT image 430 reconstructed by compensating for the motion. The CT image 430 shown in FIG. 4C corresponds to the CT image 410 shown in FIG. 4A, which is the image prior to the motion compensation. The CT image 430 shown in FIG. 4C indicates the cross-sectional image reconstructed by performing the motion compensation, based on inaccurately measured movement data of the object.

The CT image 430 shows more motion artifacts than the CT image 410. Compared with unclear edges 401, 403 and 405 shown in the CT image 410, the CT image 430 includes less clear edges 421, 423 and 425. Further, compared with the blurred portions 407, 408 and 409 shown in the CT image 410, the CT image 430 includes portions with more blurs 427, 428 and 429. As with the CT image 430 shown in FIG. 4C, when the motion compensation is performed based on inaccurately measured movement data of the object, there will be more motion artifacts in the CT image 430 than the CT image 410 prior to the motion compensation.

It is determined whether the measured movement was measured accurately to match the real physical movement to reduce or remove the motion artifacts. Hereinafter, the manner in which motion reliability, which indicates a degree to which the measured movement corresponds to the real physical movement of the object, is determined will be described in detail.

Figure 5:
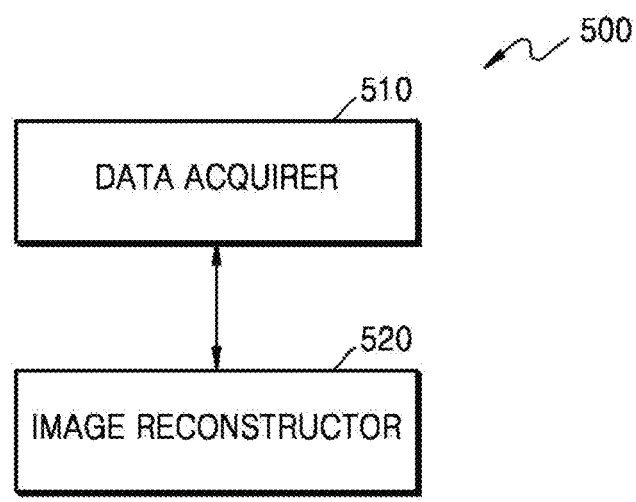
FIG. 5 is a block diagram illustrating an apparatus for processing a medical image, according to an exemplary embodiment.

FIG. 5 is a block diagram illustrating an apparatus for processing a medical image, according to an exemplary embodiment.

The apparatus for processing a medical image may be a magnetic resonance imaging (MRI) apparatus, a tomography apparatus, an X-ray apparatus, or an ultrasound diagnosis apparatus, and may process at least one of an MRI image, a tomography image, an X-ray image, and an ultrasound image. Hereinafter, the apparatus for processing the medical image is explained by using an example in which a CT imaging apparatus 500 is used to process the CT image.

The CT imaging apparatus 500 shown in FIG. 5 may be the apparatus to reconstruct the target image, which indicates the object at a target time point, by using data acquired through CT imaging of the moving object. The CT imaging apparatus 500 may be included in the CT system 100 described in FIGS. 1 and 2. In one or more exemplary embodiments, the CT imaging apparatus 500 may be included in a medical apparatus or a portable apparatus that is connected to the CT system 100 through wire or wirelessly, and be operable while connected to the CT system 100.

In one or more exemplary embodiments, when the CT imaging apparatus 500 is included in the CT system 100, a data acquirer 510 an image reconstructor 520 shown in FIG. 5 may be included in an image processor 126 shown in FIG. 2.

The data acquirer 510 may acquire the first information to determine the motion reliability by using data acquired through the CT imaging of the moving object. The motion reliability may be a value that indicates a degree to which the measured movement corresponds to the real physical movement of the object. The object may include at least one of lungs, heart, abdomen, uterus, brain, breasts and liver.

In one or more exemplary embodiments, the data acquirer 510 may acquire raw data by performing the CT imaging while rotating around the object in less than a full rotation. In this context, the raw data may refer to projection data or a sinogram that is an aggregate collection of projection data acquired by projecting radiation to the object. In detail, when the X-ray generator (106 in FIGS. 1 and 2) radiates an X-ray to the object at a predetermined location, a perspective or a direction in which the X-ray generator (106 in FIGS. 1 and 2) faces the object is referred to as a 'view.' Projection data may be raw data acquired in correspondence with one view. For example, when the X-ray generator (106 in FIGS. 1 and 2) rotates around the object, the data acquirer 510 may acquire projection data from 3 views for 1 degree of rotation.

In detail, the data acquirer 510 may acquire the first image that corresponds to the first time point and the second image that corresponds to the second time point by using data obtained from the CT imaging of the moving object. In this context, the first time point may be different from the second time point in a single cycle of the CT imaging to generate a cross-sectional image. In addition, the data acquirer 510 may acquire the first information that indicates the measured movement by measuring the movement of the object between the first time point and the second time point, corresponding to the first image and the second image. The movement of the object may be at least a difference in the shape, size and location between the object included in the first image at the first time point and the object included in the second image at the second time point, which are caused by the movement of the object. An exemplary embodiment in which the first information is acquired by measuring the movement of the object between the first time point and the second time point is described in detail in relation to FIGS. 8 through 10.

The data acquirer 510 may determine the motion reliability, which indicates a degree to which the measured movement corresponds to the real physical movement of the object based on the first information. An exemplary embodiment in which the motion reliability is determined based on the first information is described in detail in FIG. 9.

An image reconstructor 520 may reconstruct a targeted image at a target time point based on the motion reliability. The target time point may be different from the the first time point and the second time point. In one or more exemplary embodiments, the target time point may be determined by a user input.

According to an exemplary embodiment, the image reconstructor 520 may determine whether to reconstruct the target image by performing the motion compensation based on the motion reliability, and reconstruct based on the decision. For example, the image reconstructor 520 may reconstruct the target image by performing the motion compensation of the entire target image when a motion reliability value is the same as or higher than the first value, but not performing the motion compensation of the entire target image when the motion reliability value is lower than the first value. The motion reliability may be an average of the reliability values acquired for each of the entire voxels which are included in the target image.

In one or more exemplary embodiments, the image reconstructor 520 may determine whether to perform the compensation for each partial section in the target image. In detail, the image reconstructor 520 may divide a reconstructed target image into a plurality of partial sections. For example, the image reconstructor 520 may reconstruct the target image by performing the motion compensation of a partial section when the motion reliability value inside the partial section is the same as or higher than the first value while not performing the motion compensation of a partial section when the motion reliability value inside the partial section is lower than the first value.

Figure 6:
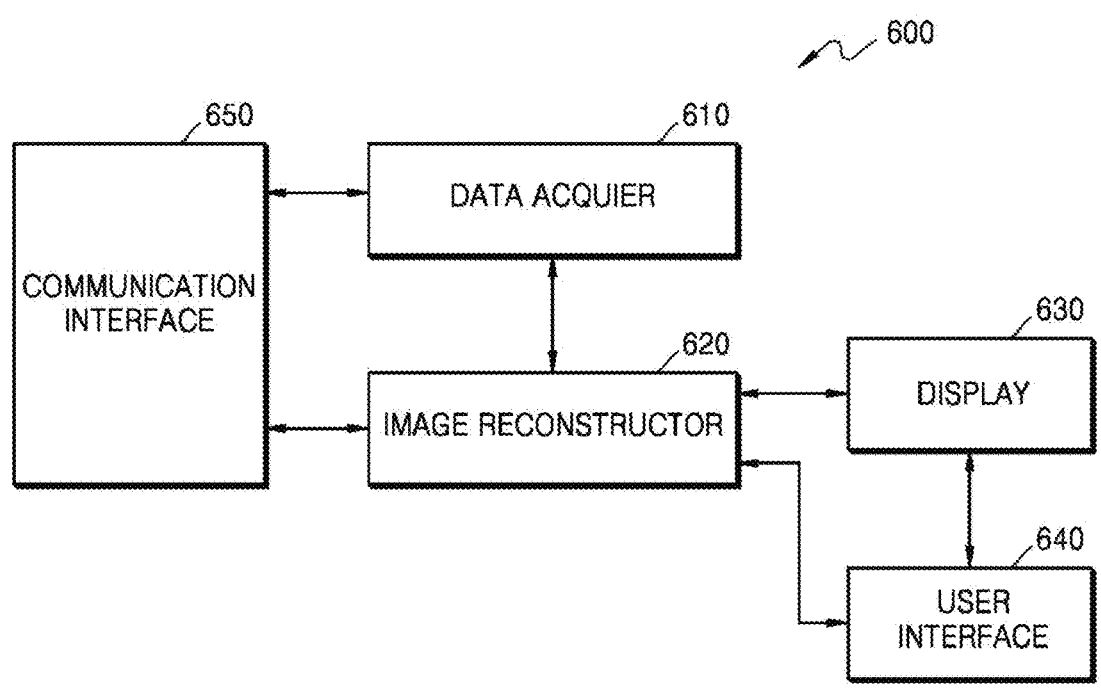
FIG. 6 is a block diagram illustrating an apparatus for processing a medical image, according to another exemplary embodiment.

FIG. 6 is a block diagram illustrating an apparatus for processing a medical image, according to another exemplary embodiment. Hereinafter, the medical image processing apparatus is described by using an example in which a CT imaging apparatus 600 is used to process a CT image.

A data acquirer 610 and an image reconstructor 620 in FIG. 6 correspond to the data acquirer 510 and the image reconstructor 520, respectively, in FIG. 5. Hereinafter, repetitive explanations that are given in FIG. 5 will be omitted.

Referring to FIG. 6, the CT imaging apparatus 600 includes the data acquirer 610 and the image reconstructor 620. In one or more exemplary embodiments, the CT imaging apparatus 600 further includes at least one of the display 630, the user interface 640 and a communication interface 650. As the display 630, the user interface 640 and the communication interface 650 that are included in the CT imaging apparatus 600 are identical to the display 130, an input interface 128 and the communication interface 132 included in the CT system 100 shown in FIG. 2 in terms of operation and configuration, repetitive explanations that are given in FIG. 2 will be omitted.

The display 630 may display a user interface screen to set whether to perform the motion compensation. In one or more exemplary embodiments, the display 630 may display a user interface screen for indicating whether the motion compensation is performed for each partial section of the target image. In one or more exemplary embodiments, the display 630 may display the user interface screen to include at least one of the motion reliability, target time point and target image.

The user interface 640 may receive a user input through the user interface screen. In detail, the user interface 640 may receive the user input to set whether to perform the motion compensation through the user interface screen. For example, a user may set whether to perform the motion compensation for each partial section of the target image through the user interface 640.

Figure 7:
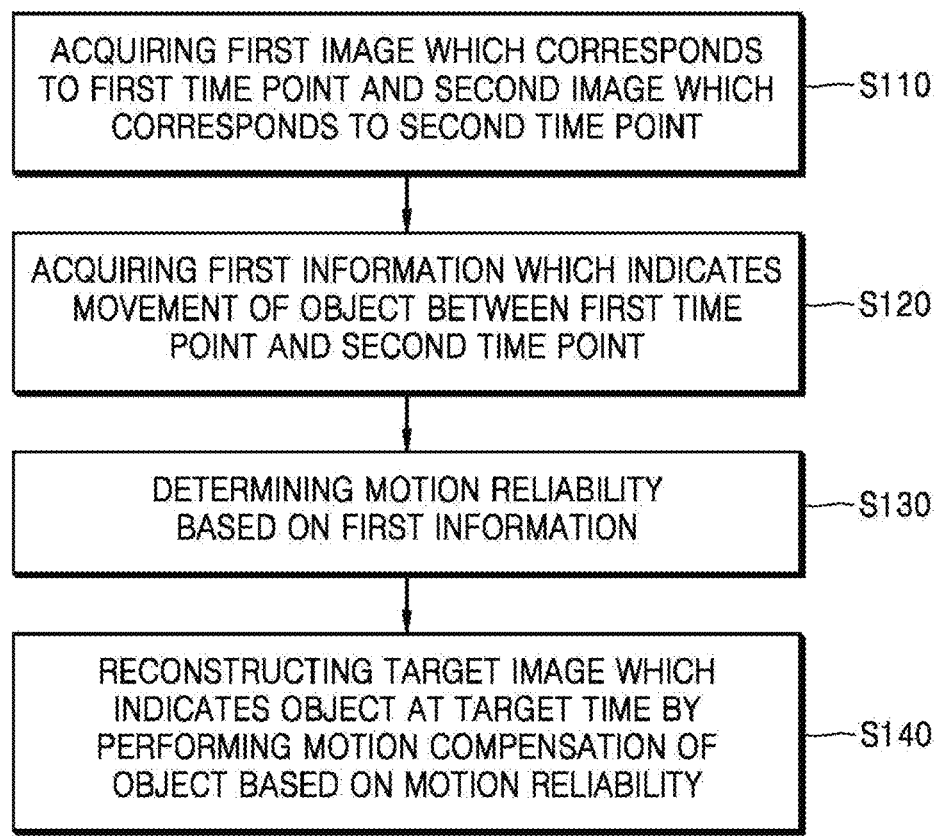
FIG. 7 is a flowchart illustrating a method of processing a tomography image, according to an exemplary embodiment.

FIG. 7 is a flowchart illustrating a method of processing a tomography image, according to an exemplary embodiment.

At stage S110, the CT imaging apparatus 500 or 600 acquires a first image which corresponds to a first time point and a second image which corresponds to a second time point by using data obtained from CT imaging of a moving object.

At stage S120, the CT imaging apparatus 500 or 600 acquires first information which indicate a movement of the object that is calculated by measuring a motion of the object between the first and the second time points, with the first and second images.

At stage S130, the CT imaging apparatus 500 or 600 determines a motion reliability that indicates a degree to which the measured movement corresponds to a real physical movement of the object, based on the acquired first information.

At stage S140, the CT imaging apparatus 500 or 600 reconstructs a target image which indicate the object at a target time point by performing motion compensation of the object based on the determined motion reliability.

Figure 8A:
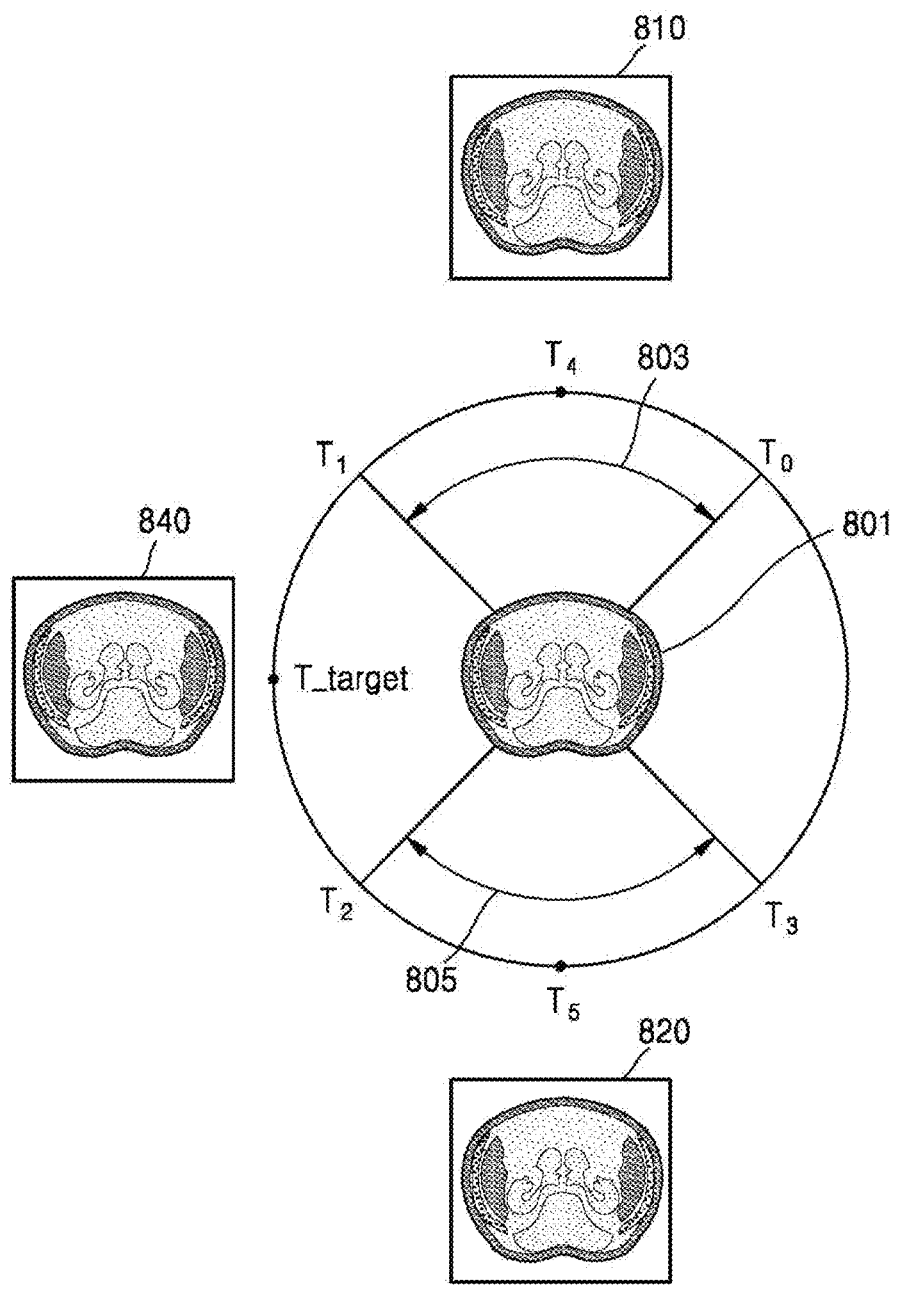
FIGS. 8A, 8B, and 8C are diagrams illustrating how CT imaging apparatuses acquire a movement of an object, according to an exemplary embodiment.
Figure 8B:
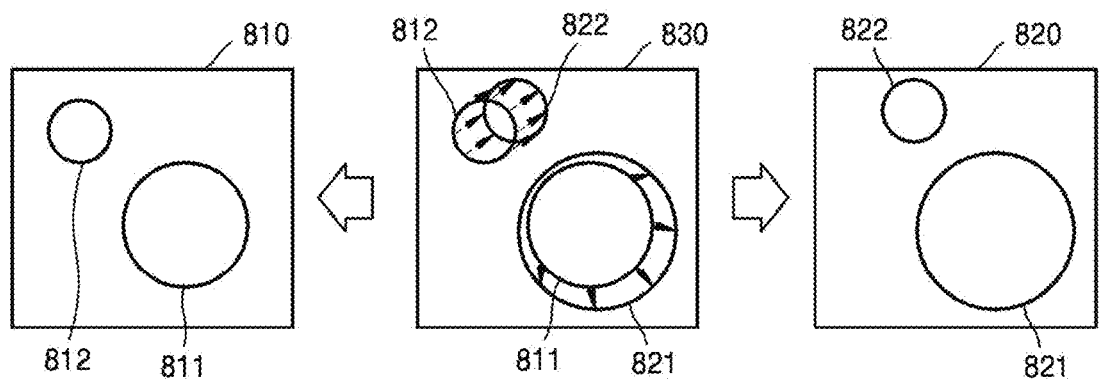
Figure 8C:
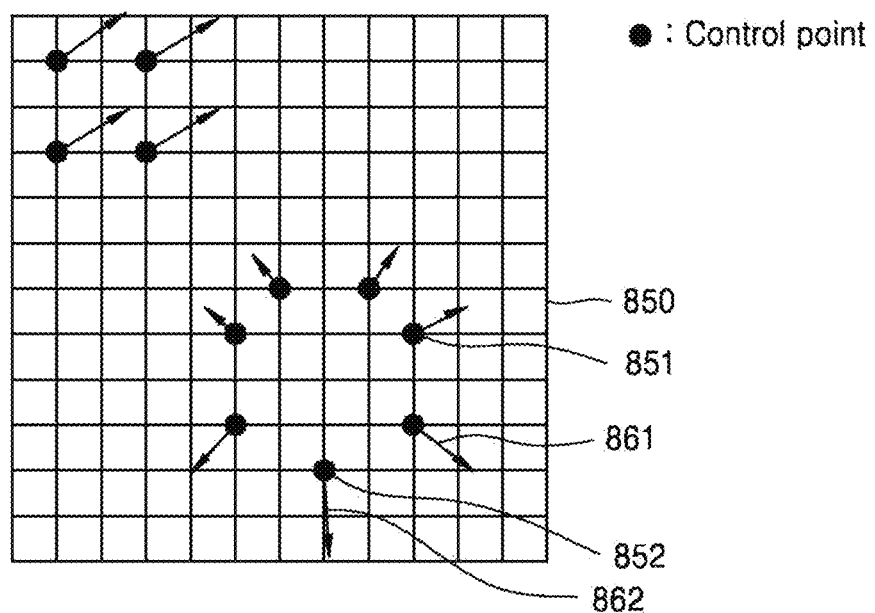

FIGS. 8A, 8B, and 8C are diagrams illustrating how the CT imaging apparatuses 500 and 600 acquire a movement of an object 801, according to an exemplary embodiment. In detail, FIGS. 8A to 8C illustrate how the CT imaging apparatuses 500 and 600 acquire the movement of the object 801 between a first time point ($T_4$) and a second time point ($T_5$) by using data acquired through the CT imaging of the moving object 801.

FIG. 8A is a view illustrating how the X-ray generator 106 in FIG. 1 rotates around the object 801 following a circular trajectory for the duration of time from a time point T0 to a time point T3. Time points T0, T1, T2, T3, T4, and T5 indicate each time point when the X-ray generator 106 in FIG. 1 is placed at a marked location on the circular trajectory.

For example, the X-ray generator 106 in FIG. 1 may generate the X-ray while rotating from the time point T0 to the time point T1. The CT imaging apparatuses 500 and 600 may acquire a first image 810 that indicates the object 801 at the time point T4 that is halfway between the time points T0 and T1, by using raw data obtained from projecting the X-ray to the object. Likewise, the X-ray generator 106 in FIG. 1 may generate the X-ray while rotating from the time point T2 to the time point T3, and the CT imaging apparatuses 500 and 600 may acquire a second image 820 that indicates the object 801 at the time point T5 that is halfway between the time points T2 and T3 by using raw data obtained from projecting the X-ray to the object. The first image 810 and the second image 820 may be either a complete cross-sectional image that shows the entire object or an incomplete image that shows a part of the object.

The CT imaging apparatuses 500 and 600 may measure the movement of the object between the first image 810 and the second image 820. In one or more exemplary embodiments, the CT imaging apparatuses 500 and 600 may reconstruct the target image 840 at a target time point T_target based on the motion reliability that indicates the degree to which the measured movement corresponds to the real physical movement of the object. For example, the targeted time point T_target may be somewhere between the first time point T4 and the second time point T5.

FIG. 8B illustrates the movement between the first image 810 that corresponds to the first time point and the second image 820 that corresponds to the second time point.

The first image 810 shown in FIG. 8B may be the image that corresponds to the first time point $T_4$ shown in FIG. 8A, and the second image 820 shown in FIG. 8B may be the image that corresponds to the second time point $T_5$. The first image 810 may include a first section 812 and a second section 811 of the object. The second image 820 may include a third section 822 and a fourth section 821 of the object. The third section 822 and the fourth section 821 of the object at the second time point $T_5$ indicate shapes of the first section 812 and the second section 811 after moving for the duration from $T_4$ to $T_5$. In an image 830 for comparison, motion vectors are illustrated to indicate the movement of the object for the duration from $T_4$ to $T_5$.

Referring to FIG. 8C, by comparing surfaces that indicate identical regions of the object that is included in the two images, it is possible to calculate a motion vector that indicates location difference values and directions for the compared surfaces. In addition, the motion vector may be used as information about the movement of the object. In this context, the information that includes motion vectors and indicates motion information of predetermined regions of the object may constitute a motion vector field (MVF). In other words, the motion vector field indicates the information on the movement of the surface that constitutes the object.

In this context, the motion vector field is the information obtained to extract the movement of the object, and may measure the information on the movement of the object by using non-rigid registration. In one or more exemplary embodiments, the information on the movement of the object may be measured by using various methods of measuring motions including rigid registration, optical flow and feature matching. Hereinafter, the the motion vector field is explained by using an example in which the non-rigid registration method is used to acquire the motion vector field.

In detail, it is possible to set a plurality of control points at an image grid 850 of the first image 810 or the second image 820, and calculate optimal motion vectors 861 and 862 at each control point. The motion vectors 861 and 862 may include the directions and magnitude of the motion. For example, it is possible to set a plurality of control points 851 and 852 at the image grid 850 shown in FIG. 8C. In this case, the motion vector 862 may be calculated at the control point 852. In addition, the motion vector field is calculated that indicate the motion vectors at every voxel by interpolating the motion vectors at each control point. For example, a method of interpolating the motion vector may be used in the form of a B-spline free form deformation method. In one or more exemplary embodiments, an optimization method may be used as a method for calculating the optimal motion vector at each control point.

In detail, the optimization method is a technique to renew the motion vector field by repeatedly renewing the motion vector at the plurality of control points; warping the first image 810 and the second image 820 based on the renewed motion vector; and calculating the motion vector by stopping the repetition when the similarity reaches the highest level after comparing the warped first image or second image with the second image 820 or the first image 810 prior to the warping. In this case, the level of similarity may be used with a negative number of sum of squared difference of luminous intensity of the two images that are compared.

In another exemplary embodiment, it is possible to calculate the motion vector by setting the control point at the surface of the object and comparing control points that indicate identical points of the object at the first image 810 and the second image 820. In detail, a relative difference between the control points is obtained by matching control points. In addition, a relative difference value may be used as the motion vector at a current control point. The motion vector field is calculated, which indicates the motion vectors at every voxel, by interpolating the motion vectors at each control point. As described above, a method of interpolating the motion vector may be used in the form of a B-spline free form deformation method.

Figure 9A:
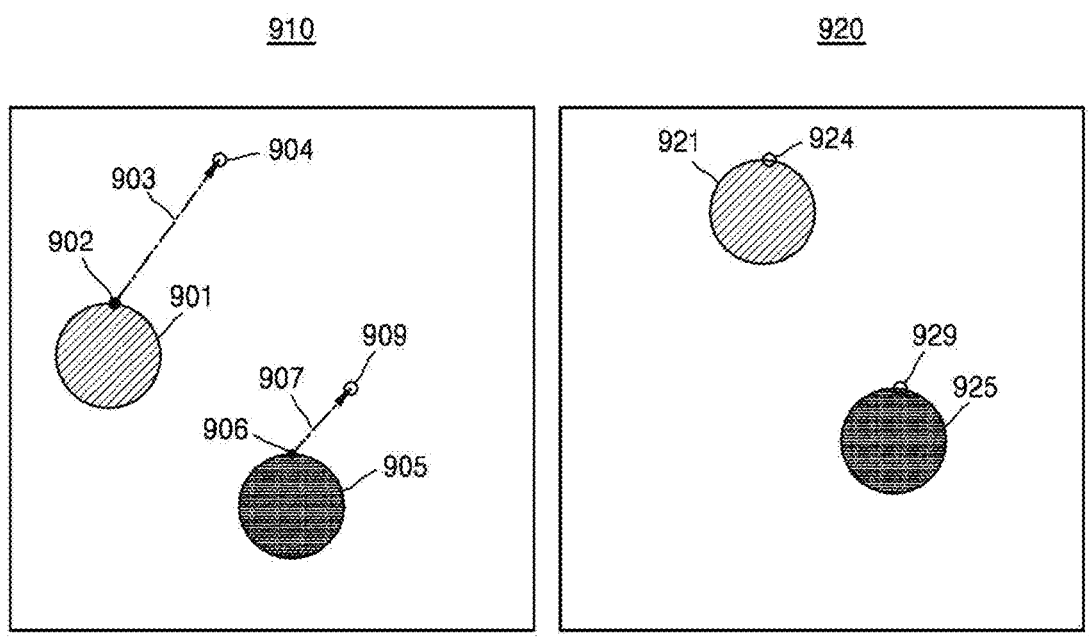
FIGS. 9A, 9B, and 9C are views illustrating how to calculate a motion reliability by measuring motion vectors of first and second images, according to an exemplary embodiment.
Figure 9B:
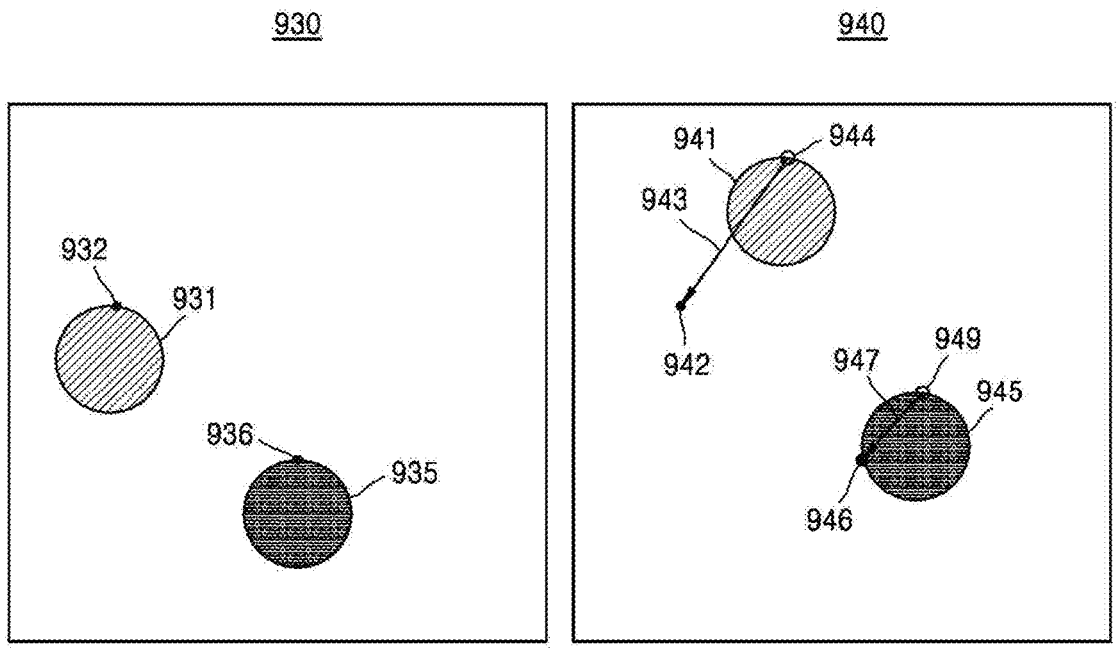
Figure 9C:
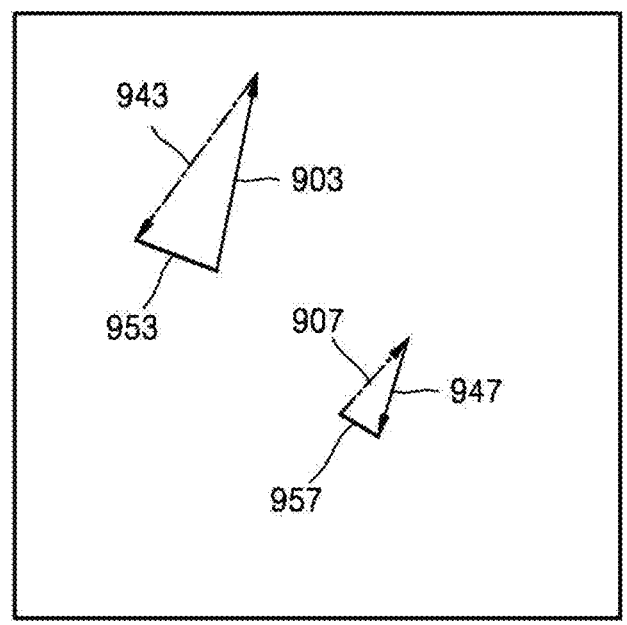

FIGS. 9A, 9B, and 9C are views illustrating how to calculate a motion reliability by measuring motion vectors of first and second images, according to an exemplary embodiment.

FIG. 9A is a view illustrating how to calculate the right directional vectors that indicate the movement of the object from the first time point to the second time point based on the first image. A first image 910 and a second image 920 may correspond to the first image 810 and the second image 820 shown in FIG. 8B. A first control point 902 may be set at a first section 901 of the the first image 910 while a second control point 906 may be set at a second section 905 of the the first image 910.

The second image 920 may show the shape of the object at the second time point. Each of a third section 921 and a fourth section 925 of the second image 920 includes a first movement location 924 and a second movement location 929, respectively. The first movement location 924 and the second movement location 929 may correspond to each of the first control point 902 and the second control point 906.

In the first image 910 is illustrated a first right directional vector 903 that indicates the movement of the object from the first control point 902 to a first location 904 that corresponds to the first movement location 924. In the first image 910 is illustrated a second right directional vector 907 that indicates the movement of the object from the second control point 906 to a second location 909 that corresponds to the second movement location 929. The first right directional vector 903 and the second right directional vector 907 may be calculated by the non-rigid registration method which is described above.

At this point, the motion vector field may be calculated that indicate the motion vectors at every voxel by interpolating the motion vectors at each control point. However, the motion vector fields at every generated voxel may be different from the amount of real physical movement due to noises or incomplete shapes (e.g., incomplete images) of the image. In one or more exemplary embodiments, the motion vector fields calculated by the optimization method may also be different from the amount of real physical movement. In one or more exemplary embodiments, values of the first movement location 924 and the second movement location 929 that are calculated in correspondence with the first control point 902 and the second control point 906 of the first image 910 may be different from the locations of the object at a second time point. The motion vector fields that are calculated this way at every voxel may be different from a precise amount of movement of the moving object from the first time point to the second time point.

FIG. 9B is a view illustrating how to calculate reverse directional vectors which indicate the movement of the object from the second time point to the first time point based on the second image. In FIG. 9B is illustrated how a first control point 944 of a first section 941 is set at the first location 904 that corresponds to the first movement location 924, and a second control point 949 of a second section 947 is set at the second control point 909 that corresponds to the second movement location 929.

Each of a first section 931 and a second section 935 of a first image 930 may include a first movement location 932 and a second movement location 936. The first movement location 932 and the second movement location 936 may correspond to each location of the the first control point 944 and the second control point 949.

In a second image 940 is illustrated a first reverse directional vector 943 that indicates the reverse directional movement of the object from the first control point 944 to a location 942 that corresponds to the first movement location 932. In the second image 940 is illustrated a second right directional vector 947 that indicates the movement of the object from the second control point 949 to a location 946 that corresponds to the second movement location 936.

As described above in FIG. 9A, reverse directional motion vector fields generated by interpolating the motion vectors, when calculating the motion vector field at every voxel, may be different from the amount of real physical movement. In other words, the motion vector fields at every generated voxel may be different from the amount of real physical movement due to noises or incomplete shapes (e.g., incomplete images) of the image. In one or more exemplary embodiments, the motion vector fields calculated by the optimization method may also be different from the amount of real physical movement. In one or more exemplary embodiments, values of the first movement location 932 and the second movement location 936 may be different from locations of the object in the first image. The reverse directional motion vector fields that are calculated the aforementioned way at every voxel may be different from an amount of movement of the moving object from the first time point to the second time point.

FIG. 9C is a view illustrating a motion error of the right directional motion vectors and the reverse directional motion vectors. In detail, in an image 950, it is possible to calculate a first motion error 953 between the first right directional motion vector 903, which indicates the movement of the first section of the object from the first time point to the second time point, and the first reverse directional motion vector 943, which indicates the movement of the first section of the object from the second time point to the first time point. Likewise, it is possible to calculate a second motion error 957 between the second right directional motion vector 907, which indicates the movement of the second section of the object from the first time point to the second time point, and the second reverse directional motion vector 947, which indicates the movement of the second section of the object from the second time point to the first time point.

As described above, because the right directional motion vectors and the reverse directional motion vectors do not indicate an accurate movement of the object at the first image and the second image, the first motion error 953 and the second motion error 957 may occur. The motion reliability may be determined based on the calculated motion error. In detail, if the right directional motion vectors and the reverse directional motion vectors are calculated for every voxel, motion errors may also be calculated for every voxel. For example, the first motion error 953 may be related to the motion reliability at the first control point 902 when based on the first image 910 shown in FIG. 9A. The second motion error 957 may be related to the motion reliability at the second control point 906 when based on the first image 910 shown in FIG. 9A.

Meanwhile, the value of motion reliability may be a reciprocal of the value of motion error. For example, in the case that the reciprocal of the second motion error 957 is larger than the reciprocal of the first motion error 953, the value of motion reliability at the second control point 906 may be larger than the value of motion reliability at the first control point 902. As describe above, the value of the motion reliability may be calculated based on the locations of the first image, but may be calculated based on the locations of the target image which correspond to the locations of the first image.

Figure 10:
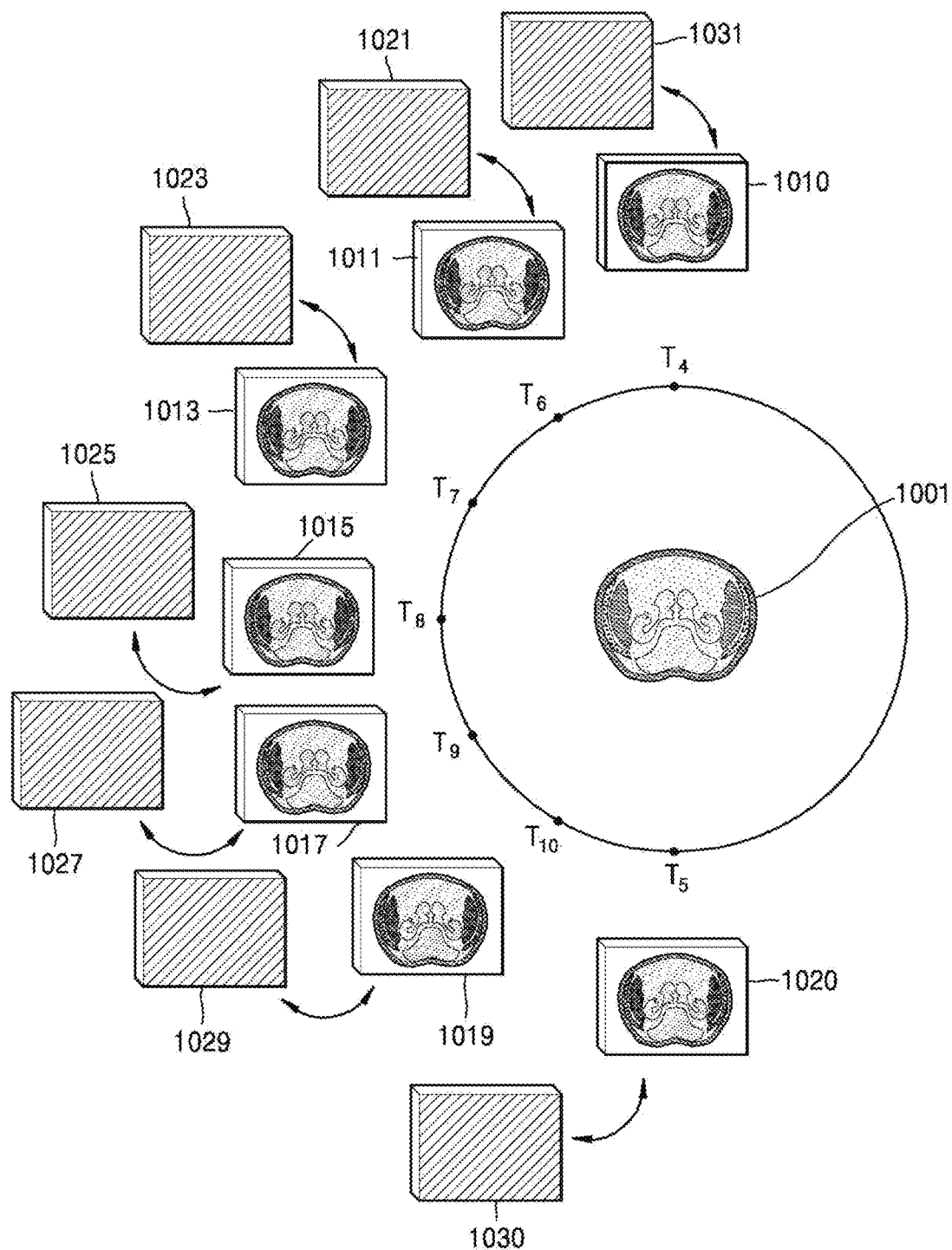
FIG. 10 is a view illustrating how to calculate a motion reliability by using projection data of reconstructed images that had their motion compensated for, according to an exemplary embodiment.

FIG. 10 is a diagram illustrating how to calculate a motion reliability by using projection data of reconstructed images that had their motion compensated for, according to an exemplary embodiment.

A plurality of reconstructed images 1010, 1011, 1013, 1015, 1017, 1019 and 1020 may be the images that had their motion compensated. The CT imaging apparatuses 500 and 600 may perform the motion compensation by using the measured movement with the first image 810 and the second image 820 in FIGS. 8A and 8B. For example, the first image 1010 may be a reconstructed cross-sectional image that indicates the object at the first time point T4 while the second image 1020 may be a reconstructed cross-sectional image that indicates the object at the second time point T5. Likewise, the CT imaging apparatuses 500 and 600 may acquire the plurality of reconstructed images between the time points T4 and T5, based on the measured movement. In detail, at each of the time points T4, T6, T7, T8, T9, T10 and T5, which exist between the time points T4 and T5, the plurality of reconstructed images 1010, 1011, 1013, 1015, 1017, 1019 and 1020, may be acquired, which had their motion compensated.

If the measured movement of the object between the first time point T4 and the second time point T5 is identical to the real physical movement of the object, the value of estimated projection data acquired by forward projection of the reconstructed images 1010, 1011, 1013, 1015, 1017, 1019 and 1020 at each of T4, T6, T7, T8, T9, T10 and T5 may be different by a very small margin from the value of measured projection data 1031, 1021, 1023, 1025, 1027, 1029 and 1033 acquired by the CT imaging at the plurality of time points.

As described above, the CT imaging apparatuses 500 and 600 may determine the motion reliability based on an acquired error by comparing the degree to which the measured movement of the object corresponds to the real physical movement of the object between the first time point T4 and the second time point T5.

Figure 11:
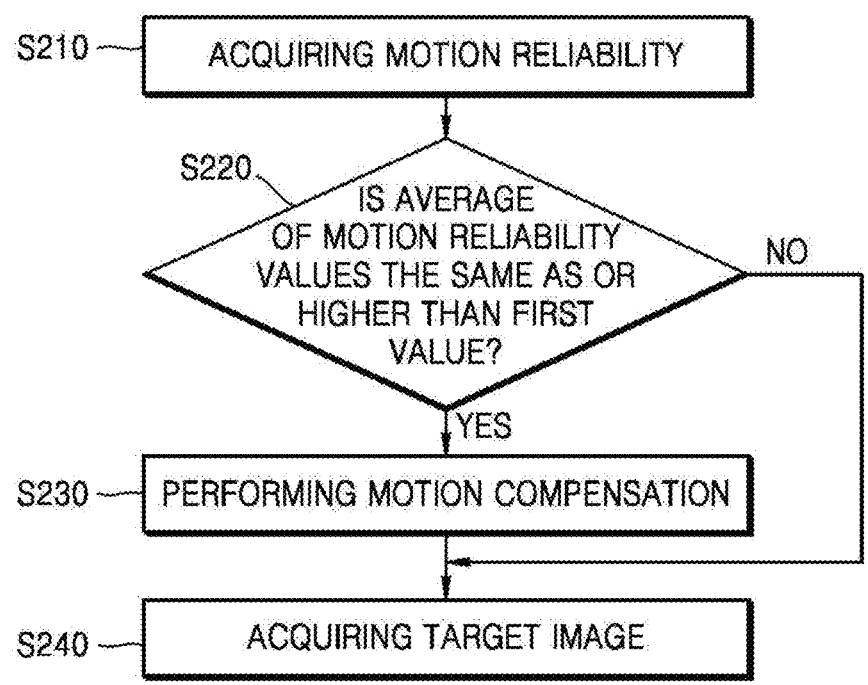
FIG. 11 is a flowchart illustrating a method of processing a tomography image according to another exemplary embodiment.

FIG. 11 is a flowchart illustrating a method of processing a tomography image, according to another exemplary embodiment.

At stage S210, the CT imaging apparatuses 500 and 600 may acquire a motion reliability based on first information.

At stage S220, the CT imaging apparatuses 500 and 600 may determine whether an average of motion reliability values at every voxel of a restored image is the same as or higher than a predetermined first value. For example, the first value may be predetermined by a user input. To perform the motion compensation only when the motion reliability is relatively large, it is possible to set the first value to be large. If the average of the motion reliability values at every voxel of the restored image is the same as or higher than the predetermined first value, the CT imaging apparatuses 500 and 600 may proceed to stage S230. Otherwise, the CT imaging apparatuses 500 and 600 may proceed to stage S240.

At stage S230, the CT imaging apparatuses 500 and 600 may perform motion compensation.

At stage S240, the CT imaging apparatuses 500 and 600 may acquire a reconstructed target image.

According to an exemplary embodiment shown in FIG. 11, it is possible to perform the motion compensation to reconstruct the cross-sectional image only when the motion reliability is the same or higher than a value, reducing artifact caused by the movement of the object.

Figure 12A:
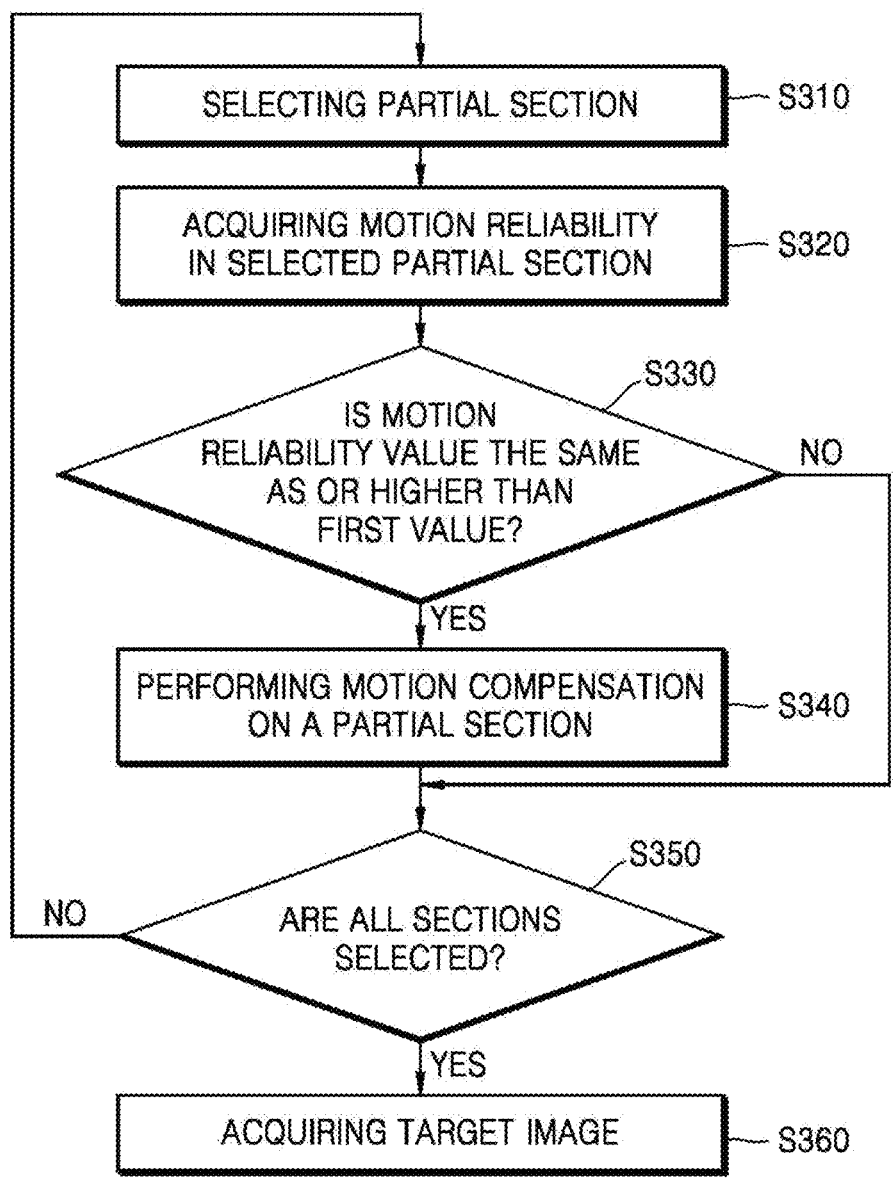
FIGS. 12A and 12B is a flowchart illustrating a method of processing a tomography image according to another exemplary embodiment.

FIG. 12A is a flowchart illustrating a method of processing a tomography image, according to another exemplary embodiment.

At stage S310, the CT imaging apparatuses 500 and 600 may select a partial section of a cross-sectional image. In this case, the cross-sectional image may be either a target image or a first image or a second image. Partial sections of the cross-sectional image may be sections that are divided from the entire cross-sectional image or sections that are divided from a part of the cross-sectional image.

At stage S320, the CT imaging apparatuses 500 and 600 may acquire a motion reliability in a selected partial section based on first information.

At stage S330, the CT imaging apparatuses 500 and 600 may determine whether a average of a motion reliability at every voxel of the partial section of the reconstructed image is the same as or higher than a predetermined first value. If the average of the motion reliability at every voxel of the partial section is the same as or higher than the predetermined first value, the CT imaging apparatuses 500 and 600 may continue in stage S340. Otherwise, the CT imaging apparatuses 500 and 600 may continue in stage S350.

At stage S340, the CT imaging apparatuses 500 and 600 may perform motion compensation on a partial section.

At stage S350, the CT imaging apparatuses 500 and 600 may determine whether all partial sections of the cross-sectional image are selected. If all partial sections are selected, the CT imaging apparatuses 500 and 600 may proceed in stage S360. Otherwise, the CT imaging apparatuses 500 and 600 may return to stage S310.

At stage S360, the CT imaging apparatuses 500 and 600 may acquire a reconstructed target image.

According to an exemplary embodiment shown in FIG. 12A, the motion compensation is performed for the partial section whose motion reliability is the same as or higher than a value while the motion compensation is not performed for the partial section whose motion reliability is lower than a value. Therefore, the motion compensation is performed more efficiently only for the parts whose motion reliability is high.

Figure 12B:
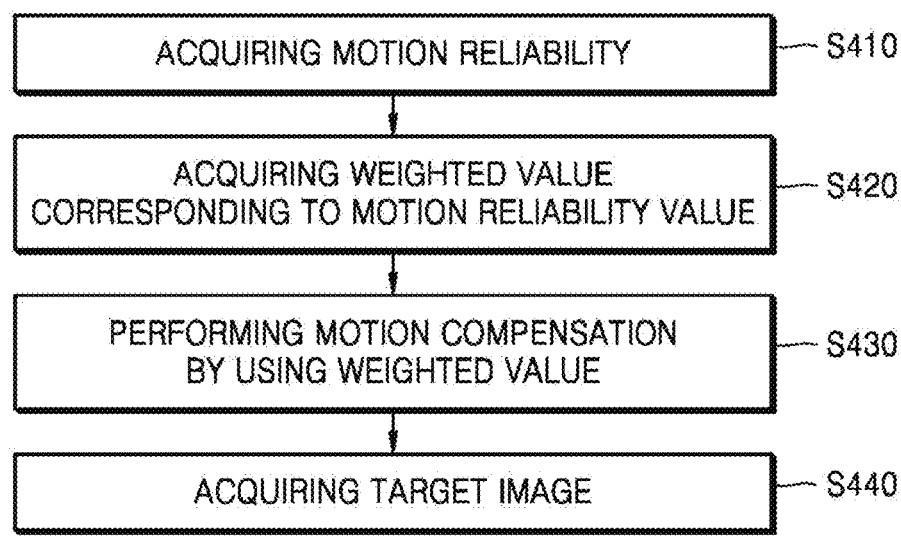

FIG. 12B is a flowchart illustrating a method of processing a tomography image, according to another exemplary embodiment.

At stage S410, the CT imaging apparatuses 500 and 600 may acquire a motion reliability based on first information.

At stage S420, the CT imaging apparatuses 500 and 600 may acquire a weighted value corresponding to the motion reliability value of a reconstructed image.

At stage S430, the CT imaging apparatuses 500 and 600 may perform the motion compensation by using the weighted value. In other words, the CT imaging apparatuses 500 and 600 may perform the motion compensation by using the weighted value that corresponds to the motion reliability value. For example, the motion reliability value may be normalized as a value that exists between 0 and 1. The CT imaging apparatuses 500 and 600 may perform the motion compensation by applying normalized motion reliability value as the weighted value. In detail, when the normalized motion reliability value is 0, the CT imaging apparatuses 500 and 600 may not perform the motion compensation. When the normalized motion reliability value is 1, the CT imaging apparatuses 500 and 600 may perform the motion compensation based on the motion vector value. When the normalized motion reliability value exists between 0 and 1, the CT imaging apparatuses 500 and 600 may perform the motion compensation by using the value obtained from multiplying motion vector value and normalized motion reliability value.

At stage S440, the CT imaging apparatuses 500 and 600 may acquire a reconstructed target image.

Figure 13A:
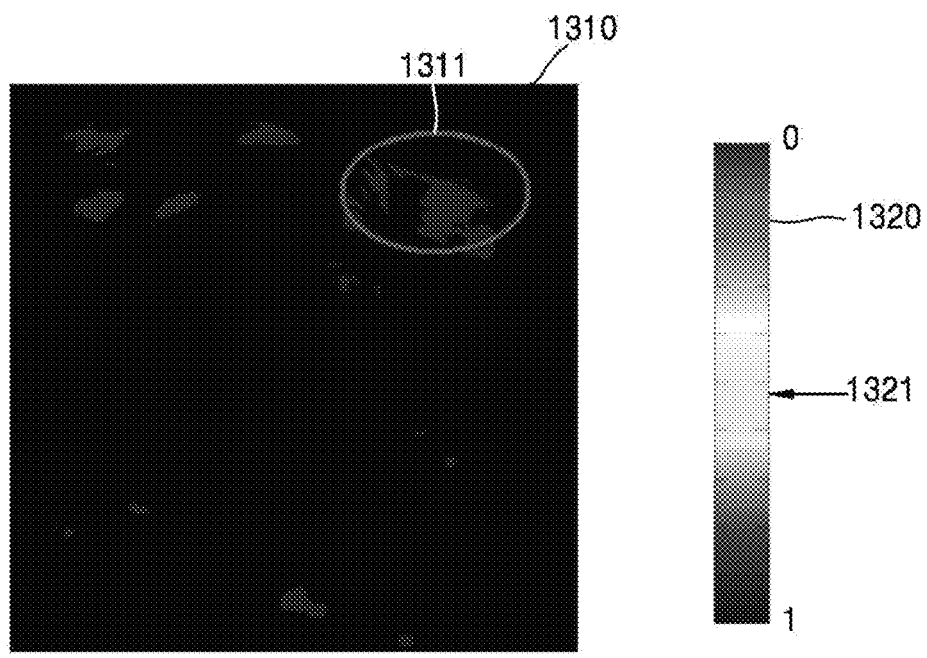
FIGS. 13A and 13B are views illustrating a screen that is displayed by a display, according to an exemplary embodiment.
Figure 13B:
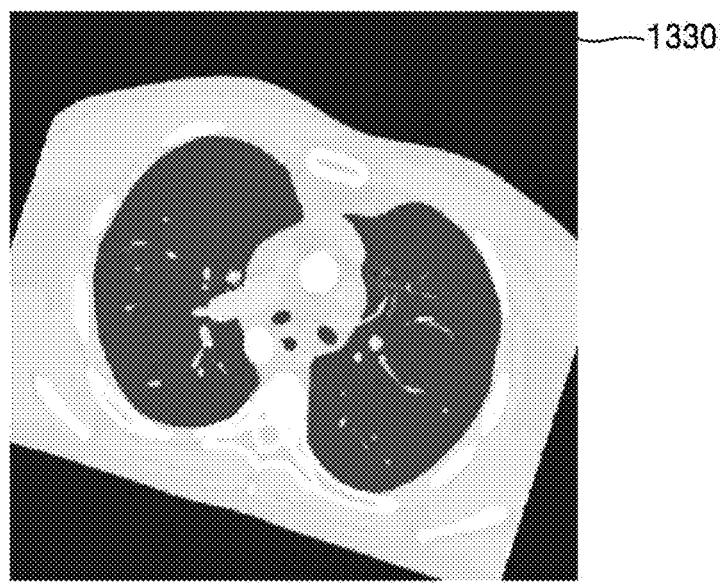

FIGS. 13A and 13B are views illustrating a screen that is displayed by the display 630, according to an exemplary embodiment. According to an exemplary embodiment, the CT imaging apparatuses 500 and 600 may display a screen to show a color-coded image 1310, which marks, to each voxel, a color that corresponds to the motion reliability acquired for each voxel.

On the right side of the color-coded image 1310 shown in FIG. 13A may be marked a color bar 1320 that shows the motion reliability value that corresponds to each color. A first color 1321 that is marked on the color bar 1320 may be the color that corresponds to the first value of the motion reliability values. The number 0 and 1 marked on the top or bottom of the color bar 1320 may be the normalized motion reliability value.

FIG. 13A indicates the color-coded image 1310 that includes a section 1311 that is marked with a color that is shown below the first color 1321.

FIG. 13B indicates a reconstructed image 1330 that is obtained by performing the motion compensation only for the section marked with a color, which is shown below the first color 1321. As shown in FIG. 13B, the motion compensation is performed only for the section that has the high motion reliability, the motion artifact may be reduced before the motion compensation. In another exemplary embodiment, the CT imaging apparatuses 500 and 600 may perform the motion compensation by using the weighted value that corresponds to the motion reliability value of the reconstructed image.

Figure 14A:
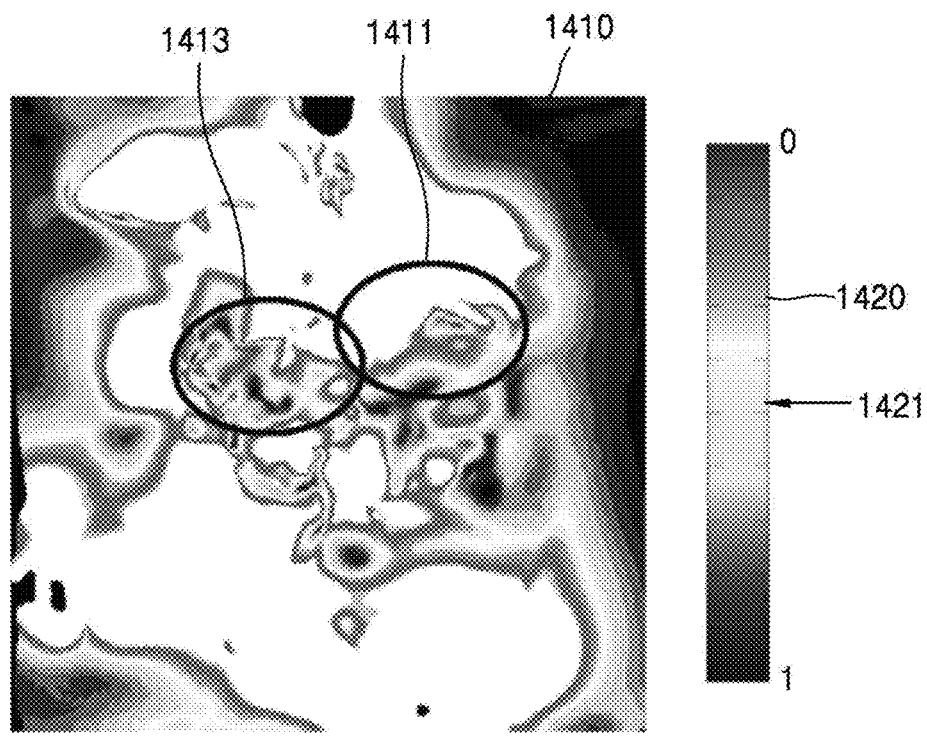
FIGS. 14A and 14B are views illustrating a screen that is displayed by the display, according to another exemplary embodiment.
Figure 14B:
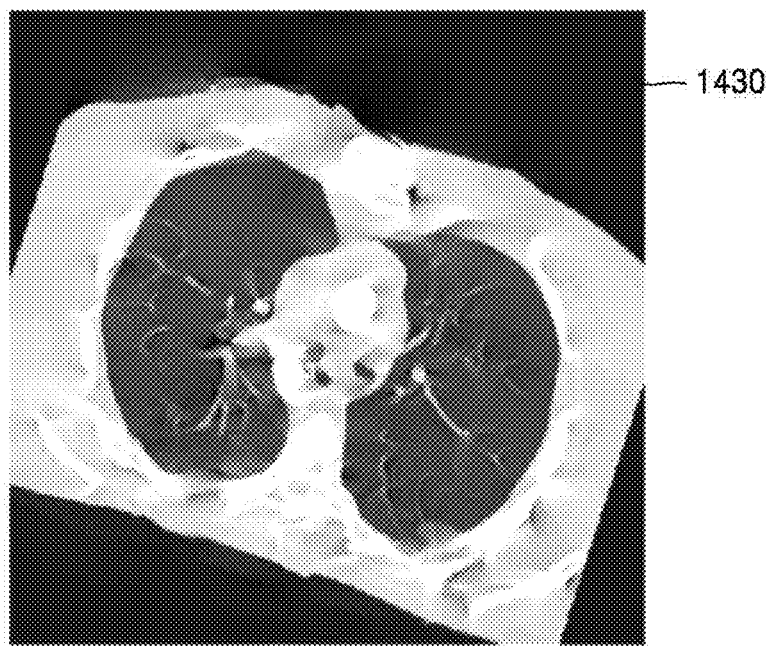

FIGS. 14A and 14B are views illustrating a screen that is displayed by the display 630, according to another exemplary embodiment.

On the right side of a color-coded image 1410 shown in FIG. 14A may be marked a color bar 1420 that shows the motion reliability value which corresponds to each color. A first color 1421 marked on the color bar 1420 may be the color that corresponds to the first value of the motion reliability values. The color-coded image 1410 includes partial sections 1413 and 1411 that contain the color-coded voxels marked with colors that are shown above the first color 1421 on the color bar 1420. The partial sections 1413 and 1411 in the color-coded image 1410 may be the sections that have the motion reliability lower than the first value.

FIG. 14B indicates a image 1430 that had the motion compensation performed for all sections of the color-coded image 1410. Referring to the color-coded image 1410, the image 1430 that had the motion compensation performed for the sections whose motion reliability is lower than the first value may have larger motion artifact than before the motion compensation.

Figures 15A, 15B, 15C:
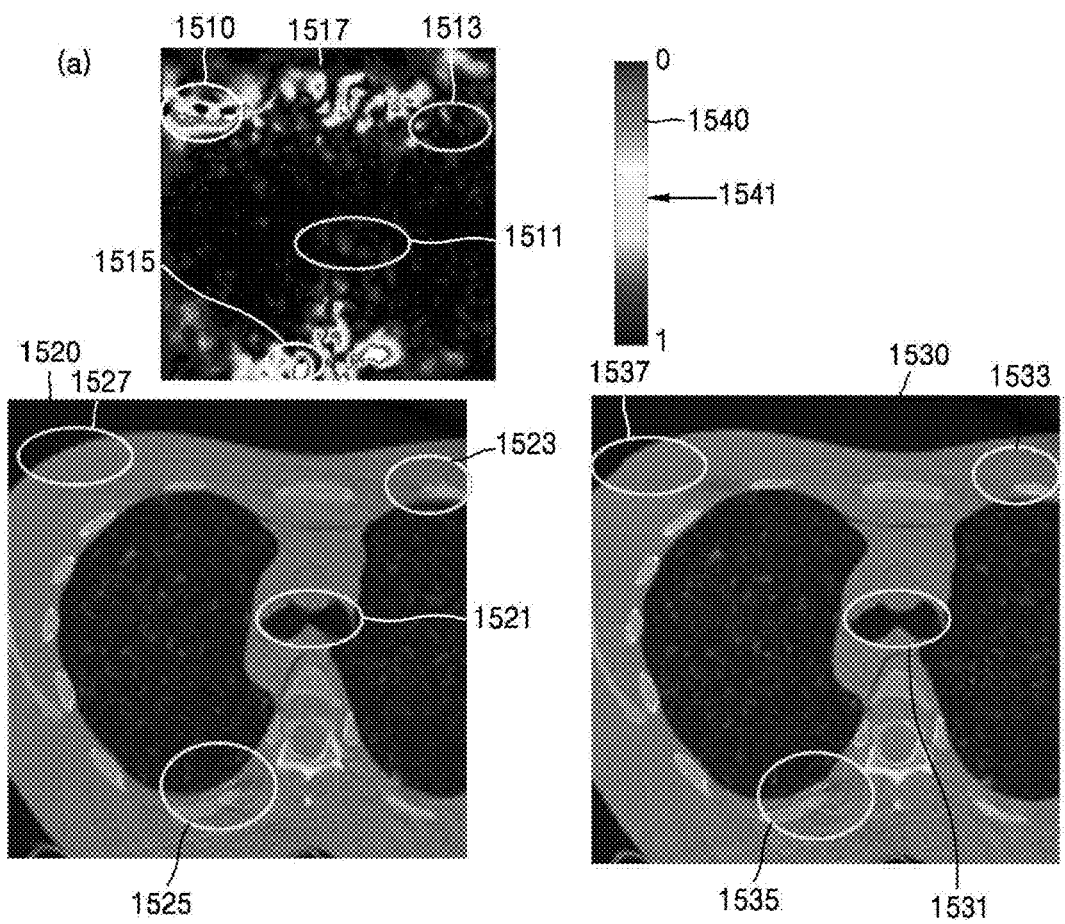
FIGS. 15A, 15B, and 15C are views illustrating a screen that is displayed by the display, according to another exemplary embodiment.

FIGS. 15A, 15B, and 15C are views illustrating a screen that is displayed by the display 630, according to another exemplary embodiment.

On the right side of a color-coded image shown in FIG. 15A may be marked a color bar 1540 that shows the motion reliability value that corresponds to each color. A first color 1541 marked on the color bar 1540 may be the color that corresponds to the first value of the motion reliability values. The number 0 and 1 marked on the top or bottom of the color bar 1540 may be the normalized motion reliability value.

The the color-coded image shown in FIG. 15A includes partial sections 1510 and 1515 that contain the color-coded voxels marked with colors which are shown above the first color 1541 on the color bar 1540.

FIG. 15B indicates an image 1520 that did not have the motion compensation performed, while FIG. 15C indicates an image 1530 that had the motion compensation performed for all sections.

Partial sections 1537 and 1535 shown in FIG. 15 (c) that correspond to the partial sections 1510 and 1515 of the color-coded image shown in FIG. 15A may have their shapes distorted more than partial sections 1527 and 1525 of the image 1520 that does not have the motion compensation performed. The partial sections 1510 and 1515 that are marked with colors shown above the first color 1541 on the color bar 1540 may have less motion artifacts when reconstructing as a cross-sectional image without performing the motion compensation, as with the partial sections 1527 and 1525.

When motion compensation is performed for partial sections 1513 and 1511 that are marked with colors shown below the first color 1541 of the color-coded image, they may look like partial sections 1533 and 1531 shown in FIG. 15C. They have less artifacts than partial sections 1523 and 1521 of the image 1520 that did not have the motion compensation performed.

When using the CT imaging apparatuses 500 and 600, according to an exemplary embodiment, the motion compensation may be performed only for the voxels of the sections marked with colors below the first color 1541 on the color bar 1540 in the color-coded image shown in FIG. 15A that corresponds to the first value of the motion reliability value. In one or more exemplary embodiments, the motion compensation may not be performed for the voxels of the sections marked with colors above the first color 1541 on the color bar 1540 in the color-coded image. In another exemplary embodiment, the CT imaging apparatuses 500 and 600 may perform the motion compensation by using the weighted value that corresponds to the motion reliability value.

Figure 16:
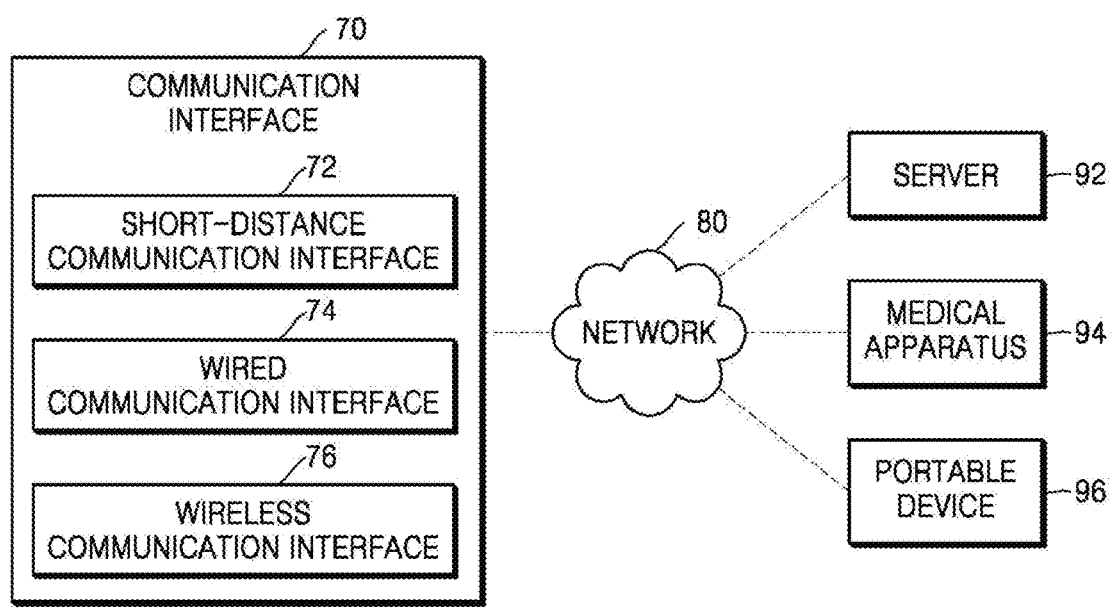
FIG. 16 is a block diagram of a communication interface, according to an exemplary embodiment.

FIG. 16 is a block diagram of a communication interface 70, according to an exemplary embodiment.

The communication interface 70 may transmit and receive data to and from a hospital server or another medical apparatus in a hospital, which is connected through a picture archiving and communication system (PACS), and perform data communication according to the digital imaging and communications in medicine (DICOM) standard.

As shown in FIG. 16, the communication interface 70 may be connected to a network 80 by wire or wirelessly to communicate with a server 92, a medical apparatus 94, or a portable device 96. The communication interface 70 may be connected by wire or wirelessly connected to a network 80 and therefore may perform communication with the server 92, the medical apparatus 94, or the portable device 96.

In detail, the communication interface 70 may transmit and receive data related to the diagnosis of an object through the network 80, and may also transmit and receive a medical image captured by the medical apparatus 94, such as a CT apparatus, an MRI apparatus, or an X-ray apparatus. In addition, the communication interface 70 may receive a diagnosis history or a treatment schedule of the object from the server 92 and use the same to diagnose the object. The communication interface 70 may perform data communication not only with the server 92 or the medical apparatus 94 in a hospital, but also with the portable device 96, such as a mobile phone, a personal digital assistant (PDA), or a laptop of a doctor or customer.

Also, the communication interface 70 may transmit information about a malfunction of the CT system or about a medical image quality to a user through the network 80, and receive a feedback regarding the information from the user.

The communication interface 70 may include at least one component enabling communication with an external apparatus. For example, the communication interface 70 may include a local area communication interface 72, a wired communication interface 74, and a wireless communication interface 76.

The local area communication interface 72 refers to a module for performing local area communication with an apparatus within a predetermined distance. Examples of local area communication technology according to an exemplary embodiment of the inventive concept include, but are not limited to, a wireless local area network (LAN), Wi-Fi, Bluetooth, ZigBee, Wi-Fi direct (WFD), ultra wideband (UWB), infrared data association (IrDA), Bluetooth low energy (BLE), and near field communication (NFC).

The wired communication interface 74 refers to a module for performing communication by using an electric signal or an optical signal. Examples of wired communication technology according to an exemplary embodiment of the inventive concept include wired communication techniques using a twisted pair cable, a coaxial cable, and an optical fiber cable, and other wired communication techniques.

The wireless communication interface 76 transmits and receives a wireless signal to and from at least one selected from a base station, an external apparatus, and a server in a mobile communication network. Here, the wireless signal may be a voice call signal, a video call signal, or data in any one of various formats according to transmission and reception of a text/multimedia message.

The CT imaging apparatus 500 shown in FIG. 5 and the CT imaging apparatus 600 shown in FIG. 6 may be external medical apparatuses 94 connected to a network 80 or external portable apparatuses 96. In other words, the CT imaging apparatuses 500 and 600 may be operable while being connected to a communication interface 70 shown in FIG. 16.

While not restricted thereto, an exemplary embodiment can be embodied as computer-readable code on a computer-readable recording medium. For example, a control program that controls the above-described operations may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units can include circuitry, a processor, a microprocessor, etc., and may execute a computer program stored in a computer-readable medium.

The foregoing exemplary embodiments and advantages are examples and are not to be construed as limiting. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A tomography apparatus comprising:
a data acquirer configured to:
acquire a first image corresponding to a first time point and a second image corresponding to a second time point, based on data that is obtained from performing tomography on a moving object;
acquire first information indicating a movement of the object between the first time point and the second time point; and
determine a motion reliability indicating a degree to which the movement of the object corresponds to a physical movement, based on the first information; and
an image reconstructor configured to reconstruct a target image indicating the object at a target time point, based on the motion reliability.

2. The apparatus of claim 1, wherein the image reconstructor is further configured to:
determine whether to reconstruct the target image by performing motion compensation on the target image, based on the motion reliability; and
generate the target image based on the determining.

3. The apparatus of claim 1, wherein the first information comprises:
right directional vectors indicating the movement of the object from the first time point to the second time point; and
reverse directional vectors indicating the movement of the object from the second time point to the first time point.

4. The apparatus of claim 3, wherein the data acquirer is further configured to determine the motion reliability based on a motion error of a right directional vector, among the right directional vectors, and a reverse directional vector corresponding to the right directional vector, among the reverse directional vectors.

5. The apparatus of claim 4, wherein the motion reliability is proportional to a reciprocal of the motion error.

6. The apparatus of claim 1, wherein the image reconstructor is further configured to reconstruct the target image by performing motion compensation on the target image in response to the motion reliability being greater than or equal to a value.

7. The apparatus of claim 1, wherein the image reconstructor is further configured to:
   divide the target image into partial sections; and
   for each of the partial sections, in response to the motion reliability within a partial section being greater than or equal to a value, perform motion compensation on the partial section.

8. The apparatus of claim 1, wherein the image reconstructor is further configured to reconstruct the target image by performing motion compensation on the target image with a weighted value corresponding to the motion reliability.

9. The apparatus of claim 1, wherein the image reconstructor is further configured to determine the motion reliability based on the first information for each of voxels in the target image.

10. The apparatus of claim 9, further comprising a display configured to display a color-coded image marking, on each of the voxels, a color corresponding to the motion reliability.

11. The apparatus of claim 1, further comprising a display configured to display a user interface for determining whether to perform motion compensation on the target image, the user interface being configured to receive a user input.

12. The apparatus of claim 1, further comprising a display configured to display a screen indicating whether motion compensation is performed for each of partial sections of the target image.

13. The apparatus of claim 1, further comprising a display configured to display at least one among the motion reliability, the target time point, and the target image.

14. The apparatus of claim 1, wherein the data acquirer is further configured to:
   acquire reconstructed images that are motion compensated at time points between the first time point and the second time point, based on the first information;
   determine an error by comparing estimated projection data that is acquired by a forward projection of the reconstructed images and measured projection data that is acquired by computed tomography imaging at the time points; and
   determine the motion reliability based on the error.

15. A method of processing a tomography image, the method comprising:
   acquiring a first image corresponding to a first time point and a second image corresponding to a second time point, based on data that is obtained from performing tomography on a moving object;
   acquiring first information indicating a movement of the object between the first time point and the second time point;
   determining a motion reliability indicating a degree to which the movement of the object corresponds to a physical movement, based on the first information; and
   reconstructing a target image indicating the object at a target time point, based on the motion reliability.

16. The method of claim 15, wherein the reconstructing comprises:
   determining whether to reconstruct the target image by performing motion compensation on the target image, based on the motion reliability; and
   generating the target image based on the determining.

17. The method of claim 15, wherein the reconstructing comprises:
   reconstructing the target image by performing motion compensation on the target image in response to the motion reliability being greater than or equal to a value.

18. The method of claim 15, wherein the reconstructing comprises:
   dividing the target image into partial sections; and
   for each of the partial sections, in response to the motion reliability within a partial section being greater than or equal to a value, performing motion compensation on the partial section.

19. The method of claim 15, wherein the reconstructing comprises:
   reconstructing the target image by performing motion compensation on the target image with a weighted value corresponding to a motion reliability.

20. A non-transitory computer-readable recording medium storing a program comprising instructions to cause a computer to perform the method of claim 15.

* * * * *